United States Patent
Giannakis et al.

(10) Patent No.: US 7,609,782 B2
(45) Date of Patent: Oct. 27, 2009

(54) SPACE-TIME CODED TRANSMISSIONS WITHIN A WIRELESS COMMUNICATION NETWORK

(75) Inventors: Georgios B. Giannakis, Minnetonka, MN (US); Shengli Zhou, Mansfield, CT (US)

(73) Assignee: Regents of the University of Minnesota, St. Paul, MN (US)

( * ) Notice: Subject to any disclaimer, the term of this patent is extended or adjusted under 35 U.S.C. 154(b) by 240 days.

(21) Appl. No.: 11/682,664

(22) Filed: Mar. 6, 2007

(65) Prior Publication Data

US 2008/0037685 A1 Feb. 14, 2008

Related U.S. Application Data

(63) Continuation of application No. 10/158,390, filed on May 28, 2002, now Pat. No. 7,190,734.

(60) Provisional application No. 60/293,476, filed on May 25, 2001.

(51) Int. Cl.
*H04B 7/06* (2006.01)
*H04B 7/02* (2006.01)

(52) U.S. Cl. ...................... 375/299; 375/267

(58) Field of Classification Search ............... 375/146, 375/260, 267, 299, 347; 455/500, 561, 562.1, 455/101, 103, 132
See application file for complete search history.

(56) References Cited

U.S. PATENT DOCUMENTS 6,088,408 A 7/2000 Calderbank et al.
6,178,196 B1 * 1/2001 Naguib et al. ............... 375/148
6,317,411 B1 * 11/2001 Whinnett et al. ............ 370/204
6,430,231 B1 * 8/2002 Calderbank et al. ......... 375/295
6,442,214 B1 8/2002 Boleskei et al.
6,452,981 B1 9/2002 Raleigh et al.
6,614,861 B1 9/2003 Terry et al.

(Continued)

FOREIGN PATENT DOCUMENTS

WO 2001/080446 A2 10/2001

OTHER PUBLICATIONS

Paulraj, A.J.; Papadias, C.B.; "Space-time processing for wireless communications," Signal Processing Magazine, IEEE vol. 14, Issue 6, Nov. 1997, pp. 49-83.

(Continued)

*Primary Examiner*—Young T. Tse
(74) *Attorney, Agent, or Firm*—Shumaker & Sieffert, P.A.

(57) ABSTRACT

Techniques are described for space-time block coding for single-carrier block transmissions over frequency selective multipath fading channels. Techniques are described that achieve a maximum diversity of order $N_t N_r (L+1)$ in rich scattering environments, where $N_t (N_r)$ is the number of transmit (receive) antennas, and L is the order of the finite impulse response (FIR) channels. The techniques may include parsing a stream of information-bearing symbols to form blocks of K symbols, precoding the symbols to form blocks having J symbols, and collecting consecutive $N_s$ blocks. The techniques may further include applying a permutation matrix to the $N_s$ blocks, generating a space-time block coded matrix having $N_t$ rows that are communicated through a wireless communication medium. The receiver complexity is comparable to single antenna transmissions, and the exact Viterbi's algorithm can be applied for maximum-likelihood (ML) optimal decoding.

25 Claims, 5 Drawing Sheets

U.S. PATENT DOCUMENTS

| | | | |
|---|---|---|---|
| 6,678,263 | B1 * | 1/2004 | Hammons et al. ............ 370/342 |
| 7,190,734 | B2 | 3/2007 | Giannakis et al. |
| 2002/0122502 | A1 | 9/2002 | El-Gamal et al. |
| 2002/0136327 | A1 | 9/2002 | El-Gamal et al. |
| 2005/0058217 | A1 | 3/2005 | Sandhu et al. |
| 2005/0063483 | A1 * | 3/2005 | Wang et al. .................. 375/267 |
| 2005/0128936 | A1 | 6/2005 | Shao |

OTHER PUBLICATIONS

Onggosanusi, E.N.; Sayeed, A.M.; Van Veen, B.D.; "Canonical space-time processing for wireless communications," IEEE Transactions on Communications, vol. 48, Issue 10, Oct. 2000, pp. 1669-1680.

F.W. Vook et al., "Transmit Diversity Schemes for Broadband Mobile Communication Systems," Vehicular Technology Conference Fall 2000, IEEE Vehicular Technology Society, pp. 2523-2529, Sep. 24-28, 2000.

Communication from corresponding Japanese Patent Application Serial No. 2003-501123 mailed Jan. 31, 2008 (5 pages).

Agrawal et al., "Space-Time Coded OFDM for High Data-Rate Wireless Communication Over Wideband Channels," IEEE VTC, vol. 3, pp. 2232-2236, 1998.

Akbar M. Sayeed et al., "Joint Multipath-Doppler Diversity in Mobile Wireless Communications," IEEE Transactions On Communications, vol. 47, No. 1, pp. 123-132, Jan. 1999.

Alamouti, "A Simple Transmit Diversity Technique for Wireless Communications," IEEE Journal on Select Areas in Communications, vol. 16, No. 8, pp. 1451-1458, Oct. 1998.

Al-Dhahir, "Single-Carrier Frequency-Domain Equalization for Space-Time Block-coded Transmissions Over Frequency-Selective Fading Channels," IEEE Communications Letters, vol. 5, No. 7, pp. 304-306, 2001.

Alexandra Duel-Hallen et al., "Long-Range Predication of Fading Channels," IEEE Signal Processing Magazine, pp. 62-75, May 2000.

Amos Lapidoth et al., "Fading Channels: How Perfect Need "Perfect Side Information" be?," in Procedures IEEE Information Theory Communications Workshop, pp. 36-38, Jun. 1999.

Anna Scaglione et al., "Filterbank Transceivers Optimizing Information Rate in block Transmissions Over Dispersive Channels," IEEE Transactions on Information Theory, vol. 45, No. 3, pp. 1019-1032, Apr. 1999.

Anna Scaglione et al., "Redundant Filterbank Precoders and Equalizers Part I: Unification and Optimal Designs," IEEE Transactions on Signal Processing, vol. 47, No. 7, pp. 1988-2022, Jul. 1999.

Babak Hassibi et al., "How Much Training Is Needed in Multiple-Antenna Wireless Links?" IEEE Transactions On Information Theory, vol. 49, No. 4, pp. 951-963, Apr. 2003.

Bölcskei et al., "Space-Frequency Coded Broadband OFDM Systems," Wireless Communications and Networking Conference, vol. 1, pp. 1-6, Sep. 2000.

Bölcskei et al., "Space-Frequency Codes for Broadband Fading Channels," IEEE International Symposium on Information Theory, Washington, D.C., Jun. 2001.

Boutros et al., "Signal Space Diversity: A Power- and Bandwidth-Efficient Diversity Technique for the Rayleigh Fading Channel," IEEE Transactions on Information Theory, vol. 44, No. 4, pp. 1453-1467, Jul. 1998.

Bringham, "Multicarrier Modulation for Data Transmission: An Idea Whose Time Has Come," IEEE Communications Magazine, pp. 5-14, May 1990.

C. Fragouli et al., "Finite-Alphabet Constant-Amplitude Training Sequence for Multiple-Antenna Broadband Transmissions," Procedures of IEEE International Conference on Communications, vol. 1, pp. 6-10, NY City, Apr. 28-May 1, 2002.

C. Fragouli et al., "Reduced-Complexity Training Schemes for Multiple-Antenna Broadband Transmissions," Procedure of Wireless Communications and Networking Conference, vol. 1, pp. 78-83, Mar. 17-21, 2002.

Caire et al., "Bit-Interleaved Coded Modulation," IEEE Transactions on Information Theory, vol. 44, No. 3, pp. 927-946, May 1998.

Choi et al., "Space-Time Block Codes Over Frequency Selective Rayleigh Fading Channels," IEEE VTC, vol. 5, pp. 2541-2545, 1999.

Choi et al., Multiple Input/Multiple Output (MIMO) Equalization for Space- Time Block Coding, IEEE Pacific Rim Conference on Communications, Computers and Signal Processing, pp. 341-344, 1999.

Cihan Tepedelenlioglu et al., "Transmitter Redundancy for Blind Estimation and Equalization of Time-and Frequency-Selective Channels," IEEE Transactions On Signal Processing, vol. 48, No. 7, pp. 2029-2043, Jul. 2000.

Clark, "Adaptive Frequency-Domain Equalization and Diversity Combining for Broadband Wireless Communications," IEEE Journal on Selected Areas in Communications, vol. 16, No. 8, pp. 1385-1395, Oct. 1998.

Courville et al., "Blind Equalization of OFDM Systems based on the Minimization of a Quadratic Criterion," Proc. of ICC, Dallas, USA, vol. 3, pp. 1318-1321, Jun. 1996.

Cristian Budianu et al., "Channel Estimation for Space-Time Orthogonal Block Codes," IEEE Transactions on Signal Processing, vol. 50, No. 10, pp. 2515-2528, Oct. 2002.

Dennis L. Goeckel, "Coded Modulation With Non-Standard Signal Sets for Wireless OFDM Systems," in Procedures International Conference Communications, Vancouver, BC, Canada, pp. 791-795, Jun. 1999.

Deva K. Borah et al., "Frequency-Selective Fading Channel Estimation with a Polynomial Time-Varying Channel Model," IEEE Transactions On Communications, vol. 47, No. 6, pp. 862-873, Jun. 1999.

Ezio Biglieri et al., "Fading Channels: Information-Theoretic and Communications Aspects," IEEE Transactions on Information Theory, vol. 44, No. 6, pp. 2619-2692, Oct. 1998.

Fredrik Tufvesson et al., "OFDM Time and Frequency Synchronization by Spread Spectrum Pilot Technique," in Procedures $8^{th}$ Communication Theory Mini-Conference, Vancouver, BC, Canada, pp. 1-5, Jun. 1999.

Frenger et al., "Decision-Directed Coherent Detection in Multicarrier Systems on Rayleigh Fading Channels," IEEE Trans. On Vehicular Tech., vol. 48, No. 2, pp. 490-498, Mar. 1999.

Furuskar et al., "EDGE: Enhanced Data Rates for GSM and TDMA/136 evolution," IEEE Personal Communications, vol. 6, No. 3, pp. 56-66, Jun. 1999.

G.B. Giannakis, "Filterbanks for Blind Channel Identification and Equalization," IEEE Signal Processing Letters, vol. 4, No. 6, pp. 184-187, Jun. 1997.

Georgios B. Giannakis et al., "Basis Expansion Models and Diversity Techniques for Blind Identification and Equalization of Time- Varying Channels," Proceedings of the IEEE, vol. 86, No. 10, pp. 1969-1986, Oct. 1998.

Georgios B. Giannakis, "Cyclostationary Signal Analysis," The Digital Signal Processing Handbook, V.K. Madisetti and D. Williams, Eds. Boca Raton, FL: CRC, Chapter 17, 1998.

Gerard J. Foschini, "Layered Space-Time Architecture for Wireless Communications in a Fading Environment When Using Multi-Element Antennas," Bell Labs Technical Journal, vol. 1, No. 2, pp. 41-59, 1996.

Ghassan Kawas Kaleh, "Channel Equalization for Block Transmission Systems," IEEE Journal on Selected Areas In Communications, vol. 13, No. 1, pp. 110-121, Jan. 1995.

Giraud et al., "Algebraic Tools to Build Modulation Schemes for Fading Channels," IEEE Transactions on Information Theory, vol. 43, No. 3, pp. 938-952, May 1997.

H. Vikalo et al., "Optimal Training for Frequency-Selective Fading Channels," Procedures of International Conference on ASSP, Salt Lake City, Utah, vol. 4, pp. 2105-2108, May 7-11, 2001.

Heath, Jr. et al., "Exploiting Input Cyclostationarity for Blind Channel Identification in OFDM Systems," IEEE Transactions on Signal Processing, vol. 47, No. 3, pp. 848-856, Mar. 1999.

Helmut Bolcskei et al., "Blind Channel Identification and Equalization in OFDM-Based Multiantenna Systems," IEEE Transactions on Signal Processing, vol. 50, No. 1, pp. 96-109, Jan. 2002.

Hikmet Sari et al., "Transmission Techniques for Digital Terrestrial TV Broadcasting," IEEE Communications Magazine, vol. 33, pp. 100-103, Feb. 1995.

Hui Liu et al., "A High-Efficiency Carrier Estimator For OFDM Communications," IEEE Communications Letters, vol. 2, No. 4, pp. 104-106, Apr. 1998.

I. Barhumi et al., "Optimal Training Sequences for Channel Estimation in MIMO OFDM Systems in Mobile Wireless Communications," Procedures of International Zurich Seminar on Access, Transmission, Networking of Broadband Communications, 6 pgs., ETH Zurich, Switzerland, Feb. 19-21, 2002.

I.Emre Telatar, "Capacity of Multiple-Antenna Gaussian Channels," European Transactions Telecommunications, vol. 10, pp. 1-28, Nov.-Dec. 1998.

J. Medbo et al., "Channel Models For Hiperlan/2 In Different Indoor Scenarios," Eur. Telecommun. Stand. Inst., Sophia-Antipolis, Valbonne, France, Norme, ETSI, document 3ER1085B, 8 pgs., Mar. 1998.

James K. Cavers, "An Analysis of Pilot Symbol Assisted Modulation for Rayleigh Fading Channels," IEEE Transactions On Vehicular Technology, vol. 40, No. 4, pp. 686-693, Nov. 1991.

James K. Cavers, "Pilot Symbol Assisted Modulation and Differential Detection in Fading and Delay Spread," IEEE Transactions On Communications, vol. 43, No. 7, pp. 2206-2212, Jul. 1995.

Jens Baltersee et al., "Achievable Rate of MIMO Channels With Data-Aided Channel Estimation and Perfect interleaving," IEEE Journal on Selected Areas In Communication, vol. 19, No. 12, 2358-2368, Dec. 2001.

Jerome A. Gansman et al., "Optimum and Suboptimum Frame Synchronization for Pilot-Symbol-Assisted Modulation," IEEE Transactions on Communciations, vol. 45, No. 10, pp. 1327-1337, Oct. 1997.

Jiann-Cing Guey et al., "Signal Design for Transmitter Diversity Wireless Communication Systems Over Rayleigh Fading Channels," IEEE Transactions on Communications, vol. 47, No. 4, pp. 527-537, Apr. 1999.

Jitendra K. Tugnait et al., "Second-Order Statistics-Based Blind Equalization of IIR Single-Input Multiple-Output Channels with Common Zeros," IEEE Transactions On Signal Processing, vol. 47, No. 1, pp. 147-157, Jan. 1999.

Jonathan H. Manton et al., "Affine Precoders for Reliable Communications," in Procedures International Conference ASSP, vol. 5, Istanbul, Turkey, pp. 2749-2752, Jun. 2000.

L. Wei et al., "Space-Time-Frequency Block Coding Over Rayleigh Fading Channels For OFDM Systems," Proceedings of the International Conference on Communication Technology, ICCT 2003, vol. 2, pp. 1008-1012, Apr. 2003.

Li et al., "Channel Estimation for OFDM Systems with Transmitter Diversity in Mobile Wireless Channels," IEEE Journal on Selected Areas in Communications, vol. 17, No. 3, pp. 461-471, Mar. 1999.

Li et al., "Transmitter Diversity for OFDM Systems and Its Impact on High-Rate Data Wireless Networks," IEEE Journal on Selected Areas in Communications, vol. 17, No. 7, pp. 1233-1243, Jul. 1999.

Lin et al., "Block Based DMT Systems with Reduced Redundancy," Proc. of Intl. Conf. On ASSP, Salt Lake City, UT, pp. 2357-2360, May 2001.

Linda M. Davis et al., "Joint MAP Equalization and Channel Estimation for Frequency-Selective and Frequency-Flat Fast-Fading Channels," IEEE Transactions On communications, vol. 49, No. 12, pp. 2106-2114, Dec. 2001.

Lindskog et al., "A Transmit Diversity Scheme for Channels with Intersymbol Interference," Proc. of ICC, vol. 1, pp. 307-311, Jun. 2000.

Liu et al., "Space-time coding for broadband wireless communications," Wireless Communications and Mobile Computing, Wiley, UK, vol. 1, No. 1, pp. 35-53, 2001.

Liu et al., "Space-Time Block-Coded Multiple Access Through Frequency-Selective Fading Channels," IEEE Transactions on Communications, vol. 49, No. 6, pp. 1033-1044, Jun. 2001.

Liu et al., "Space-Time Coding for Broadband Wireless Communications," Wireless Communications and Mobile Computing, vol. 1, No. 1, pp. 33-53, Wiley, Jan.-Mar. 2001.

Liu et al., "Space-Time Coding with Transmitantennas for Multiple Access Regardless of Frequency-Selective Multipath," Proc. of Sensor Arry and Multichannel Signal Processing Workshop, pp. 178-182, Mar. 2000.

Liu et al., "Transmit-Antennae Space-Time Block Coding for Generalized OFDM in the Presence of Unknown Multipath," IEEE Journal on Selected Areas in Communications, vol. 19, No. 7, pp. 1352-1364, Jul. 2001.

Lizhong Zheng et al., "Communication on the Grassmann Manifold: A Geometric Approach to the Noncoherent Multiple-Antenna Channel," IEEE Transactions On Information Theory, vol. 48, No. 2, pp. 359-383, Feb. 2002.

Lu et al., "Space-Time Code Design in OFDM Systems," Global Telecommunications Conference, vol. 2, pp. 1000-1004, 2000.

M. Guillaud et al., "Multi-Stream Coding for MIMO OFDM Systems With Space-Time-Frequency Spreading," Wireless Personal Multimedia Communications, the 5th International Symposium, vol. 1, pp. 120-124, Oct. 27-30, 2002.

Magnus Sandell et al., "A Comparative Study of Pilot-Based Channel Estimators for Wireless OFDM," pp. 5-34, Sep. 1996.

Martin V. Clark, "Adaptive Frequency-Domain Equalization and Diversity Combining for Broadband Wireless Communications," IEEE Journal on Selected Areas in Communications, vol. 16, No. 8, pp. 1385-1395, Oct. 1998.

Massimiliano (Max) Martone, "Wavelet-Based Separating Kernels for Sequence Estimation with Unknown Rapidly Time-Varying Channels," IEEE Communications Letter, vol. 3, No. 3, pp. 78-80, Mar. 1999.

Michail K. Tsatsanis et al., "Equalization of Rapidly Fading Channels: Self-Recovering Methods," IEEE Transactions on Communications, vol. 44, No. 5, pp. 619-630, May 1996.

Michail K. Tsatsanis et al., "Modelling and Equalization of Rapidly Fading Channels," International Journal of Adaptive Control and Signal Processing, vol. 10, pp. 159-176, May 1996.

Michail K. Tsatsanis et al., "Pilot Symbol Assisted Modulation in Frequency Selective Fading Wireless Channels," IEEE Transactions On Signal Processing, vol. 48, No. 8, pp. 2353-2365, Aug. 2000.

Michele Morelli et al., "Carrier-Frequency Estimation for Transmissions Over Selective Channels," IEEE Transactions On Communications, vol. 48, No. 9, pp. 1580-1589, Sep. 2000.

Mignone et al., "CD3-OFDM: A Novel Demodulation Scheme for Fixed and Mobile Receivers," IEEE Transactions on Communications, vol. 44, No. 9, pp. 1144-1151, Sep. 1996.

Min Dong et al., "Optimal Design and Placement of Pilot Symbols for Channel Estimation," IEEE Transactions On Signal Processing, vol. 50, No. 12, pp. 3055-3069, Dec. 2002.

Muquet at al., "A Subspace Based Blind and Semi-Blind Channel Identification Method for OFDM Systems," Proc. of IEEE-SP Workshop on Signal Proc. Advances in Wireless Comm., Annapolis, MD, pp. 170-173, May 9-12, 1999.

Muquet et al., "OFDM with Trailing Zeros Versus OFDM with Cyclic Prefix: Links, Comparisons and Application to the Hiperlan/2 Systems," Proc. of Intl. Conf. On Com., New Orleans, pp. 1049-1053, Jun. 2000.

Muquet et al., "Reduced Complexity Equalizers for Zero-Padded OFDM Transmissions," Proc. of Intl. Conf. On ASSP, vol. 5, pp. 2973-2976, Jun. 2000.

Muriel Medard, "The Effect Upon Channel Capacity in Wireless Communications of Perfect and Imperfect Knowledge of the Channel," IEEE Transactions on Information Theory, vol. 46, No. 3, pp. 933-946, May 2000.

Naguib et al., "Increasing Data Rates Over Wireless Channels," IEEE Signal Processing Magazine, vol. 17, No. 3, pp. 76-92, May 2000.

Naofal Al-Dhahir et al., "Block Transmission Over Dispersive Channels; Transmit Filter Optimization and Realization, and MMSE-DFE Receiver Performance," IEEE Transactions Information Theory, vol. 42, No. 1, pp. 137-160, Jan. 1996.

Oussama Damen et al., "Lattice Code Decoder for Space-Time Codes," IEEE Communication Letters, vol. 4, No. 5, pp. 161-163, May 2000.

Paul H. Moose, "A Technique for Orthogonal Frequency Division Multiplexing Frequency Offset Correction," IEEE Transactions On Communications, vol. 42, No. 10, pp. 2908-1314, Oct. 1994.

Peter Hoeher et al., "Channel Estimation with Superimposed Pilot Sequence," in Procedure GLOBECOM Conference, Brazil, pp. 1-5, Dec. 1999.

Peter Hoeher et al., "Two-Dimensional Pilot-Symbol-Aided Channel Estimation by Wiener Filtering," Procedures of International Conference on Acoustics, Speech and Signal Processing, Munich, Germany, vol. 3, pp. 1845-1848, Apr. 1997.

Peter Schramm et al., "Pilot Symbol Assisted BPSK on Rayleigh Fading Channels with Diversity: Performance Analysis and Parameter Optimization," IEEE Transactions on Communications, vol. 46, No. 12, pp. 1560-1563, Dec. 1998.

Peter Schramm, "Analysis and Optimization of Pilot-Channel-Assisted BPSK for DS-CDMA Systems," IEEE Transactions Communications, vol. 46, No. 9, pp. 1122-1124, Sep. 1998.

Poor et al., "Probability of Error in MMSE Multiuser Detection," IEEE Transactions on Information Theory, vol. 43, No. 3, pp. 858-871, May 1997.

Qinfang Sun et al., "Estimation of Continuous Flat Fading MIMO Channel," IEEE Transactions On Wireless Communications, vol. 1, No. 4, pp. 549-553, Oct. 2002.

Robert Molten Gray, "On the Asymptotic Eigenvalue Distribution of Toeplitz Matrices," IEEE Transactions On Information Theory, vol. IT-18, No. 6, pp. 725-730, Nov. 1972.

Rohit Negi et al., "Pilot Tone Selection for Channel Estimation in a Mobile OFDM System," IEEE Transactions On Consumer Electronics, vol. 44, No. 3, pp. 1122-1128, Aug. 1998.

Ruiz et al., "Discrete Multiple Tone Modulation with Coset Coding for the Spectrally Shaped Channel," IEEE Transactions on Communications, vol. 4, No. 6, pp. 1012-1029, Jun. 1992.

S.N. Diggavi et al., "Differential Space-Time Coding for Frequency-Selective Channels," Procedures of $36^{th}$ Conference on Information Sciences and Systems, pp. 1-8, Princeton University, NJ, Mar. 20-22, 2002.

Scaglione et al., "Redundant Filterbank Precoders and Equalizers Part II: Blind Channel Estimation, Synchronization, and Direct Equalization," IEEE Transactions on Signal Processing, vol. 47, No. 7, pp. 1988-2006, Jul. 1999.

Sergio Benedetto et al., "Principles of Digital Transmission with Wireless Applications," Kluwer Academic/Plenum Publishers, 1 pg., 1999.

Shengli Zhou et al., "Space-Time Coding With Maximum Diversity Gains Over Frequency-Selective Fading Channels," IEEE Signal Processing Letters, vol. 8, No. 10, pp. 269-272, Oct. 2001.

Shengli Zhou et al., "Subspace-Based (Semi-) Blind Channel Estimation for Block Precoded Space-Time OFDM," IEEE Transactions On Signal Processing, vol. 50, No. 5, pp. 1215-1228, May 2002.

Shuichi Ohno et al., "Average-Rate Optimal PSAM Transmissions Over Time-Selective Fading Channels," IEEE Transactions On Wireless Communications, pp. 374-378, Oct. 2002.

Shuichi Ohno et al., "Capacity Maximizing MMSE-Optimal Pilots for Wireless OFDM Over Frequency-Selective Block Rayleigh-Fading Channels," IEEE Transactions On Information Theory, pp. 2138-2145, vol. 50, No. 9, Sep. 2004.

Shuichi Ohno et al., "Optimal Training and Redundant Precoding For Block Transmissions With Application to Wireless OFDM," IEEE Transactions on Communications, vol. 50, No. 12, pp. 2113-2123, Dec. 2002.

Srihari Adireddy et al, "Optimal Placement of Training for Frequency-Selective Block-Fading Channels," IEEE Transactions On Information Theory, vol. 48, No. 8, pp. 2338-2353, Aug. 2002.

Srihari Adireddy et al., "Detection With Embedded Known Symbols: Optimal Symbol Placement and Equalization," In Procedures of International Conference ASSP, vol. 5, Istanbul, Turkey, pp. 2541-2544, Jun. 2000.

Srihari Adireddy et al., "Optimal Embedding of Known Symbols for OFDM," in Procedures International Conference, ASSP, vol. 4, Salt Lake City, UT, May 2001.

Srikrishna Bhashyam et al., "Time-Selective Signaling and Reception for Communication Over Multipath Fading Channels," IEEE Transactions On Communications, vol. 48, No. 1, pp. 1-34, Jan. 2000.

Stamoulis et al., "Block FIR Decision-Feedback Equalizers for Filterbank Precoded Transmissions with Blind Channel Estimation Capabilities," IEEE Transactions on Communications, vol. 49, No. 1, pp. 69-83, Jan. 2001.

Stefan A. Fechtel et al., "Optimal Parametric Feedforward Estimation of Frequency-Selective Fading Radio Channels," IEEE Transactions on Communications, vol. 42, No. 2/3/4, pp. 1639-1650, Feb./Mar./Apr. 1994.

Stephan Baro et al., "Improved Codes for Space-Time Trellis Coded Modulation," IEEE Communication Letters, vol. 4, pp. 1-3, Jan. 2000.

Tai-Lai Tung et al., "Channel Estimation and Adaptive Power Allocation for Performance and Capacity Improvement of Multiple-Antenna OFDM Systems," Third IEEE Signal Processing Workshop on Signal Processing Advances in Wireless Communications, Taoyuan, Taiwan, pp. 82-85, Mar. 20-23, 2001.

Tarokh et al., "Space-Time Block Codes from Orthogonal Designs," IEEE Transactions on Information Theory, vol. 45, No. 5, pp. 1456-1467, Jul. 1999.

Tarokh et al., "Space-Time Codes for High Data Rate Wireless Communication: Performance Criteria in the Presence of Channel Estimation Errors, Mobility, and Multiple Paths," IEEE Transactions on Communications, vol. 47, No. 2, pp. 199-207, Feb. 1999.

Tarokh et al., "Space-Time Codes for High Data Rate Wireless Communication: Performance Criterion and Code Construction," IEEE Transactions on Information Theory, vol. 44, No. 2, pp. 744-765, Mar. 1998.

Thomas Kailath, "Measurements on Time-Variant Communication Channels," IEEE Transactions On Information Theory, vol. IT-8, pp. S229-S236, Sep. 1962.

Thomas Keller et al., "Adaptive Multicarrier Modulation: A Convenient Framework for Time-Frequency Processing in Wireless Communications," IEEE Procedings of the IEEE, vol. 88, No. 5, pp. 611-640, May 2000.

Thomas L. Marzetta and Bertrand M. Hochwald, "Capacity of a Mobile Multiple-Antenna Communication Link in Rayleigh Flat Fading," IEEE Transactions on Information Theory, vol. 45, pp. 1-38, Jan. 1999.

Thomas P. Holden et al., "A Spread-Spectrum Based Synchronization Technique for Digital Broadcast Systems," IEEE Transactions on Broadcasting, vol. 36, No. 3, pp. 185- 194, Sep. 1990.

Tufvesson et al. "Pilot Assisted Channel Estimation for OFDM in Mobile Cellular Systems," Proc. of the Vehicular Technology Conf., Phoenix, USA, vol. 3, pp. 1639-1643, May 1997.

Ufuk Tureli et al., "OFDM Blind Carrier Offset Estimation: ESPRIT," IEEE Transactions On Communications, vol. 48, No. 9, pp. 1459-1461, Sep. 2000.

Vahid Tarokh et al., "Space-Time Block Codes from Orthogonal Designs," IEEE Transactions on Information Theory, vol. 45, No. 5, pp, 1456-1467, Jul. 1999.

van de Beek et al, "On Channel Estimation in OFDM Systems," Proc. of the Vehicular Technology Conf, Chicago, USA, vol. 2, pp. 815-819, Jul. 1995.

van Nee et al., "New High-Rate Wireless LAN Standards," IEEE Communications Magazine, vol. 37, No. 12, pp. 82-88, Dec. 1999.

Viterbo et al., "A Universal Lattice Code Decoder for Fading Channels," IEEE Transactions on Information Theory, vol. 45, No. 5, pp. 1639-1642, Jul. 1999.

Vook et al, "Transmit Diversity Schemes for Broadband Mobile Communication Systems," Proc. IEEE VTC, Fall, 2000, vol. 6, pp. 2523-2529.

Wang et al., "Linearly Proceeded or Coded OFDM against Wireless Channel Fades?," Third IEEE Signal Processing Workshop on Signal Processing Advances in Wireless Communications, pp. 267-270, 2001.

Wang et al., "Iterative (Turbo) Soft Interference Cancellation and Decoding for Coded CDMA," IEEE Transactions on Communications, vol. 47, No. 7, pp. 1046-1061, Jul. 1999.

Wang et al., "Wireless Multicarrier Communications: Where Fourier Meets Shannon," IEEE Signal Processing Magazine, pp. 29-48, May 2000.

Wang et al., Linearly Precoded or Coded OFDM against Wireless Channel Fades?, in Proc. of $3^{rd}$ IEEE Workshop on Signal Processing Advances in Wireless Communications, Taoyuan, Taiwan, R.O.C., pp. 267-270, Mar. 2001.

Wen-Yi Kuo et al., "Frequency Offset Compensation of Pilot Symbol Assisted Modulation in Frequency Flat Fading," IEEE Transactions on Communications, vol. 45, No. 11, pp. 1412-1416, Nov. 1997.

Werner Kozek, "On the Transfer Function Calculus for Underspread LTV Channels," IEEE Transactions On Signal Processing, vol. 45, No. 1, pp. 219-223, Jan. 1997.

Xiaoli Ma et al., "Maximum Diversity Transmissions Over Doubly Selective Wireless Channels," IEEE Transactions On Information Theory, vol. 49, No. 7, pp. 1832-1840, Jul. 2003.

Xiaoli Ma et al., "Non-Data-Aided Carrier Offset Estimators for OFDM With Null Subcarriers: Identifiability, Algorithms, and Performance," IEEE Journal On Selected Areas In Communications, vol. 19, No. 12, pp. 2504-2515, Dec. 2001.

Xiaoli Ma et al., "Optimal Training for Block Transmissions Over Doubly Selective Wireless Fading Channels," IEEE Transactions on Signal Processing, vol. 51, No. 5, pp. 1351-1366, May 2003.

Xin et al., "Linear Unitary Precoders for Maximum Diversity Gains with Multiple Transmit and Receive Antennas," Proc. of $34^{th}$ Asilomar Conf. On Signals, Systems, and Computers, pp. 1553-1557, Pacific Grove, CA, Oct. 29-Nov. 1, 2000.

Y. Gong et al., "Space-Frequency-Time Coded OFDM for Broadband Wireless Communications," Global Telecommunications Conference, GLOBECOM '01, IEEE, Vo. 1, pp. 519-523, Nov. 25-29, 2001.

Yan Xin et al., "Space-Time Diversity Systems Based on Linear Constellation Precoding," IEEE Transactions On Wireless Communications, vol. 2, No. 2, pp. 294-309, Mar. 2003.

Yan Xin et al., "Space-Time Diversity Systems Based on Unitary Constellation-Rotating Precoders," in Procedures International Conference, Speech, Signal Process., Salt Lake City, UT, pp. 2429-2432, May 7-11, 2001.

Ye (Geoffrey) Li, "Simplified Channel Estimation for OFDM Systems With Multiple Transmit Antennas," IEEE Transactions On Wireless Communications, vol. 1, No. 1, pp. 67-75, Jan. 2002.

Yuze Zhang et al., "A Performance Analysis and Design of Equalization with Pilot Aided Channel Estimation," Procedures of the $47^{th}$ Vehicular Technology Conference, vol. 2, pp. 720-724, 1997.

Yuze Zhang et al., "Soft Output Demodulation on Frequency-Selective Rayleigh Fading Channels Using AR Channel Models," Procedures of Global Communications Conference, vol. 1, pp. 327-331, 1997.

Zhengdao Wang et al., "Linearly Precoded or Coded OFDM Against Wireless Channel Fades?," Third IEEE Signal Processing Workshop on Signal Processing Advances in Wireless Communications, Taoyuan, Taiwan, pp. 267-270, Mar. 20-23, 2001.

Zhengdao Wang et al., "Optimality of Single-Carrier Zero-Padded Block Transmissions," Procedures of Wireless Communications and Networking Conference, vol. 2, pp. 660-664, 2002.

Zhiqiang Liu et al., "Linear Constellation Precoding for OFDM with Maximum Multipath Diversity and Coding Gains," IEEE Transactions On Communications, vol. 51, No. 3, pp. 416-427, Mar. 2003.

Zhiqiang Liu et al., Space-Time-Frequency Coded OFDM Over Frequency-Selective Fading Channels, IEEE Transactions on Signal Processing, vol. 50, No. 10, pp. 2465-2476, Oct. 2002.

Zhou et al., "Frequency-Hopped Generalized MC-CDMA for Multipath and Interference Suppression," Proc. of MILCOM Conf., Los Angeles, CA, pp. 937-941, Oct. 22-25, 2000.

Zhou et al., "Long Codes for Generalized FH-OFDMA Through Unknown Multipath Channels," IEEE Transactions on Communications, vol. 49, No. 4, pp. 721-733, Feb. 2001.

Frederick W. Vook et al., "Transmit Diversity Schemes for Broadband Mobile Communication Systems," VTC 2000, pp. 2523-2529, Sep. 28 2000.

Zhigiang Liu et al., "Space-Time Coding with Transmit Antennas for Multiple Access Regardless of Frequency-Selective Multipath," Proc. of Sensor Array and Multichanel Signal Processing Workshop, Boston, MA, pp. 178-182, Mar. 2000.

Chinese Office Action dated Jul. 13, 2007 for corresponding Chinese Application No. 02810616.4.

Youjian Liu et al., "Space-Time Codes Performance Criteria and Design for Frequency Selective Fading Channels," Later published in IEEE International Conference on Communications, vol. 9, pp. 2800-2804, Jun. 2001. (7 pages).

Xiaoli Ma et al., "Optimal Training for MIMO Frequency-Selective Fading Channels," IEEE Transactions on Wireless Communications, vol. 4, No. 2, pp. 453-466, Mar. 2, 2005.

Communication from corresponding Japanese Patent Application Serial No. 2003-501123 Mailed May 7, 2009 (2 pages).

* cited by examiner

SPACE-TIME CODED TRANSMISSIONS WITHIN A WIRELESS COMMUNICATION NETWORK

This application is a continuation of U.S. application Ser. No. 10/158,390, filed May 28, 2002, now U.S. Pat. No. 7,190,734, which claims the benefit of U.S. Provisional Application Ser. No. 60/293,476, filed May 25, 2001, the entire contents of each of which are incorporated herein by reference.

This invention was made with government support under ECS-9979443 awarded by the National Science Foundation. The government has certain rights in the invention.

TECHNICAL FIELD

The invention relates to communication systems and, more particularly, multiple-antennae transmitters and receivers for use in wireless communication systems.

BACKGROUND

Space-time (ST) coding using multiple transmit-antennae has been recognized as an attractive means of achieving high data rate transmissions with diversity and coding gains in wireless applications. However, ST codes are typically designed for frequency flat channels. Future broadband wireless systems will likely communicate symbols with duration smaller than the channel delay spread, which gives rise to frequency selective propagation effects. When targeting broadband wireless applications, it is important to design ST codes in the presence of frequency selective multipath channels. Unlike flat fading channels, optimal design of ST codes for dispersive multipath channels is complex because signals from different antennas are mixed not only in space, but also in time. In order to maintain decoding simplicity and take advantage of existing ST coding designs for flat fading channels, most conventional techniques have pursued two-step approaches. In particular, the techniques mitigate intersymbol interference (ISI) by converting frequency selective fading channels to flat fading channels, and then design ST coders and decoders for the resulting flat fading channels. One approach to ISI mitigation has been to employ a relatively complex multiple-input multiple-output equalizer (MIMO-EQ) at the receiver to turn FIR channels into temporal ISI-free ones.

Another approach, with lower receiver complexity, is to employ orthogonal frequency division multiplexing (OFDM), which converts frequency selective multipath channels into a set of flat fading subchannels through inverse Fast Fourier Transform (FFT) and cyclic prefix (CP) insertion at the transmitter, together with CP removal and FFT processing at the receiver. On the flat fading OFDM subchannels, many techniques have applied ST coding for transmissions over frequency-selective channels. Some of these assume channel knowledge, while others require no channel knowledge at the transmitter.

Although using ST codes designed for flat fading channels can at least achieve full multi-antenna diversity, the potential diversity gains embedded in multipath propagation have not been addressed thoroughly. OFDM based systems are able to achieve both multi-antenna and multipath diversity gains of order equal to the product of the number of transmit-antennas, the number of receive-antennas, and the number of FIR channel taps. However, code designs that guarantee full exploitation of the embedded diversity have not been explored. A simple design achieves full diversity, but it is essentially a repeated transmission, which decreases the transmission rate considerably. On the other hand, for single antenna transmissions, it has been shown that a diversity order equal to the number of FIR taps is achievable when OFDM transmissions are linearly precoded across subcarriers. An inherent limitation of multicarrier (OFDM) based ST transmissions is a non-constant modulus, which necessitates power amplifier back-off, and thus reduces power efficiency. In addition, multi-carrier schemes are more sensitive to carrier frequency offsets relative to their single-carrier counterparts.

SUMMARY

In general, the invention is directed to space-time block coding techniques for single carrier block transmissions in the presence of frequency-selective fading channels. Furthermore, in accordance with the techniques, a maximum diversity up to order $N_t N_r (L+1)$ can be achieved in a rich scattering environment, where $N_t$ is the number of transmit antennas, $N_r$ is the number of receive antennas, and $(L+1)$ is the number of taps corresponding to each FIR channel. The techniques enable simple linear processing to collect full antenna diversity, and incur receiver complexity that is comparable to single antenna transmissions. Notably, the transmissions enable exact application of Viterbi's algorithm for maximum-likelihood (ML) optimal decoding, in addition to various reduced-complexity sub-optimal equalization alternatives. When the transmissions are combined with channel coding, they facilitate application of iterative (turbo) equalizers. Simulation results demonstrate that joint exploitation of space-multipath diversity leads to significantly improved performance in the presence of frequency selective multipath channels.

In one embodiment, a method may comprise applying a permutation matrix to blocks of symbols of an outbound data stream, and generating transmission signals from the permutated blocks of symbols. The method may further comprise communicating the transmission signals through a wireless communication medium.

In another embodiment, a method may comprise parsing a stream of information-bearing symbols to form blocks of K symbols, precoding the symbols to form blocks having J symbols, and collecting consecutive $N_s$ blocks. The method may further comprise applying a permutation matrix to the $N_s$ blocks, generating a space-time block coded matrix having $N_t$ rows, each row containing $N_d * J$ symbols, generating $N_t$ transmission signals from the symbols of the $N_t$ rows, and communicating the $N_t$ transmission signals through a wireless communication medium.

In another embodiment, a transmitting device may comprise an encoder to apply a permutation matrix to blocks of information bearing symbols and to generate a space-time block coded matrix of the permutated blocks of symbols. The transmitting device further comprises a plurality of pulse shaping units to generate a plurality of transmission signals from the symbols of the space-time block coded matrix, and a plurality of antennae to communicate the transmission signals through a wireless communication medium.

The details of one or more embodiments of the invention are set forth in the accompanying drawings and the description below. Other features, objects, and advantages of the invention will be apparent from the description and drawings, and from the claims.

DETAILED DESCRIPTION

The Detailed Description is organized as follows: Section I deals with the special case in which a system includes of a receiver having a single antenna, and transmitter having two transmit antennas. Section II details the equalization and decoding designs. Section III generalizes the proposed schemes to multiple transmit- and receive-antennas. Simulation results are presented in Section IV.

Throughout the Detailed Description, bold upper letters denote matrices, bold lower letters stand for column vectors; $(\cdot)^*$, $(\cdot)^T$ and $(\cdot)^H$ denote conjugate, transpose, and Hermitian transpose, respectively; $E\{\cdot\}$ for expectation, $tr\{\cdot\}$ for the trace of a matrix, $\|\cdot\|$ for the Euclidean norm of a vector; $I_K$ denotes the identity matrix of size K, $0_{M \times N}$ ($1_{M \times N}$) denotes an all-zero (all-one) matrix with size M×N, and $F_N$ denotes an NXNFFT matrix with the (p+1; q+1)st entry of:

$$(1/\sqrt{N})\exp(-j2\pi pq/N), \forall p,q \in [0, N-1];$$

diag(x) stands for a diagonal matrix with x on its diagonal. $[\cdot]_p$ denotes the (p+1)st entry of a vector, and $[\cdot]_{p,q}$ denotes the (p+1; q+1)st entry of a matrix.

I. Single Carrier Block Transmissions

Figure 1:
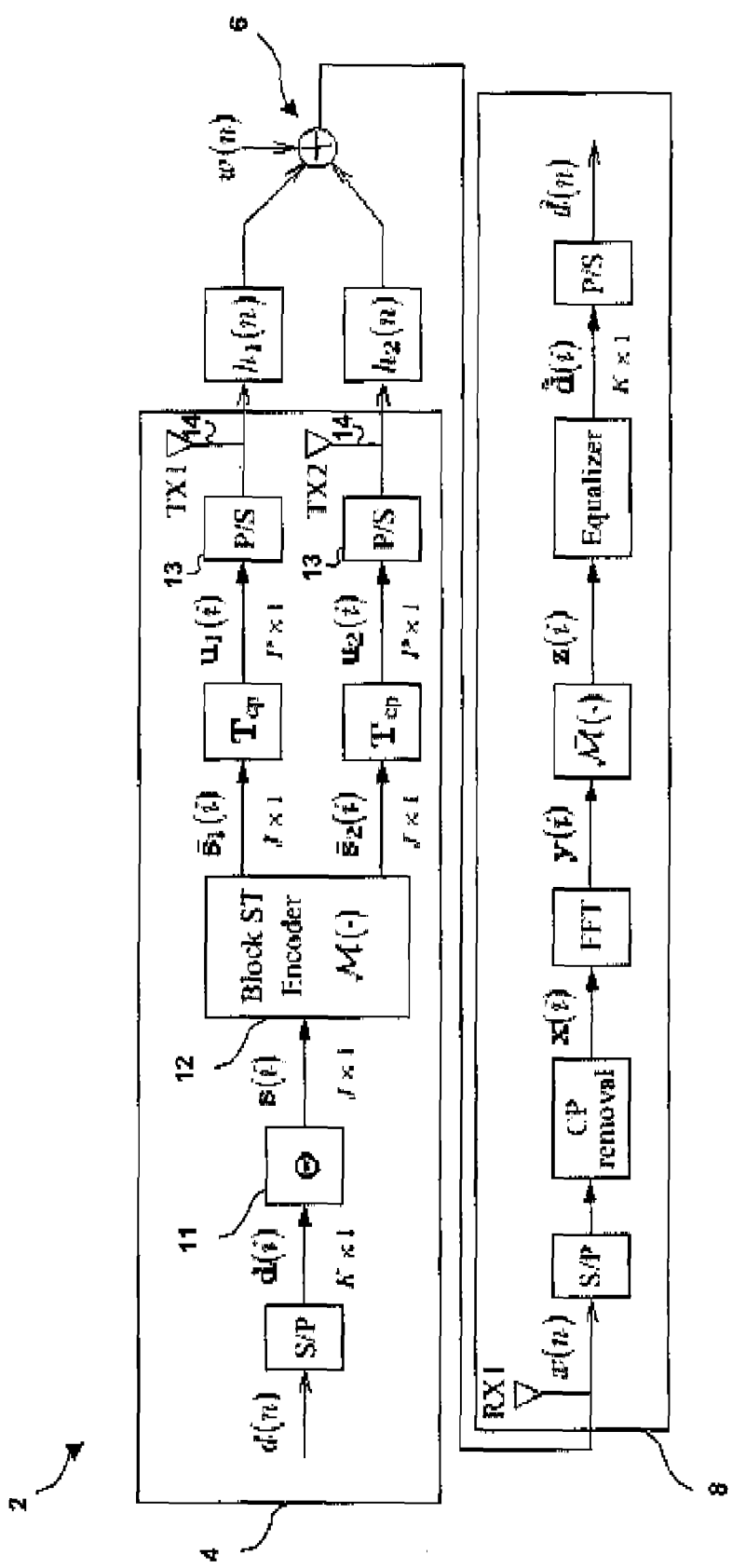
FIG. 1 is a block diagram illustrating a wireless communication system in which a transmitter communicates with a receiver through a wireless channel using space-time coded transmissions.

FIG. 1 is a block diagram illustrating a wireless communication system 2 in which a transmitter 4 communicates with a receiver 8 through a wireless communication channel 6. In particular, FIG. 1 illustrates the discrete-time equivalent baseband model in which transmitter 4 transmits a data with two transmit antennas ($N_t = 2$), and receiver 8 receives data with a single receive antenna ($N_r = 1$). Transmitter 4 includes a precoder 11, an encoder 12, two pulse shaping units 13 for generating transmission signals, and two transmission antennae 14.

The information-bearing data symbols d(n) belonging to an alphabet A are first parsed to K×1 blocks $d(i):=[d(iK); \ldots; d(iK+K-1)]^T$, where the serial index n is related to the block index i by: $n=iK+k$; $k \in [0, K-1]$. The blocks d(i) are precoded by a J×K matrix $\Theta$ (with entries in the complex field) to yield J×1 symbol blocks: $s(i):=\Theta d(i)$. The linear precoding by $\Theta$ can be either non-redundant with J=K, or, redundant when J>K. The ST encoder takes as input two consecutive blocks s(2i) and s(2i+1) to output the following 2J×2 space-time block coded matrix:

$$\begin{bmatrix} \bar{s}_1(2i) & \bar{s}_1(2i+1) \\ \bar{s}_2(2i) & \bar{s}_2(2i+1) \end{bmatrix} := \begin{bmatrix} s(2i) & -Ps^*(2i+1) \\ s(2i+1) & Ps^*(2i) \end{bmatrix} \begin{array}{l} \rightarrow \text{time} \\ \downarrow \text{space.} \end{array} \quad (1)$$

where P is a permutation matrix that is drawn from a set of permutation matrices $\{P_J^{(n)}\}_{n=0}^{J-1}$, with J denoting the dimensionality J×J. Each performs a reverse cyclic shift (that depends on n) when applied to a J×1 vector $a:=[a(0); a(1); \ldots; a(J-1)]^T$. Specifically, $[P_J^{(n)}a]_p=a((J-p+n) \bmod J)$. Two special cases are $P_J^{(0)}$ and $P_J^{(1)}$. The output of $P_J^{(0)} a=[a(J-1); a(J-2); \ldots; a(0)]^T$ performs time-reversal of a, while $P_J^{(1)}a=[a(0); a(J-1); a(J-2); \ldots; a(1)]^T=F_J^{(-1)}F_J^{(H)}=F_J^{(H)}F_J^{(H)}$ a corresponds to taking the J-point IFFT twice on the vector a. This double IFFT operation in the ST coded matrix is in fact a special case of a Z-transform approach originally proposed in Z. Liu and G. B. Giannakis, "Space-time coding with transmit antennas for multiple access regardless of frequency-selective multi-path," in Proc. of Sensor Array and Multichannel Signal Processing Workshop, Boston, Mass., March 2000, pp. 178-182, with the Z-domain points chosen to be equally spaced on the unit circle:

$$\left\{e^{j\frac{2\pi}{J}n}\right\}_{n=0}^{J-1}.$$

The techniques herein allow for any P from the set $$\{P_J^{(n)}\}_{n=0}^{J-1}.$$

At each block transmission time interval i, the blocks $s_1(i)$ and $s_2(i)$ are forwarded to the first and the second antennae of transmitter 4, respectively. From equation (1), we have:

$$\bar{s}_1(2i+1)=-P\bar{s}^*_2(2i), \bar{s}_2(2i+1)=P\bar{s}^*_1(2i), \quad (2)$$

which shows that each transmitted block from one antenna at time slot 2i+1 is a conjugated and permuted version of the corresponding transmitted block from the other antenna at time slot 2i (with a possible sign change). For flat fading channels, symbol blocking is unnecessary, i.e., J=K=1 and P=1, and the design of (1) reduces to the Alamouti ST code matrix. However, for frequency selective multipath channels, the permutation matrix P is necessary as will be clarified soon.

Figure 2:
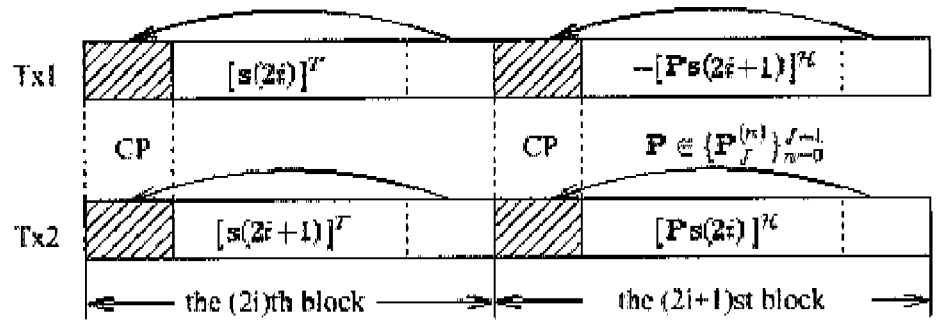
FIGS. 2-3 are timing diagrams illustrating the transmitted sequences from the antennas of the transmitter of FIG. 1.

To avoid inter-block interference in the presence of frequency selective multipath channels, transmitter 4 insert a cyclic prefix for each block before transmission. Mathematically, at each antenna $\mu \in [1, 2]$, a tall P×J transmit-matrix $T_{cp}:=[I_{cp}^T, I_J^T]^T$, with $I_{cp}$ comprising the last P−J rows of $I_P$, is applied on $\bar{s}_\mu(i)$ to obtain P×1 blocks: $u_\mu(i)=T_{cp}\bar{s}_\mu(i)$. Indeed, multiplying $T_{cp}$ with $\bar{s}_\mu(i)$ replicates the last P−L entries of $\bar{s}_\mu(i)$ and places them on its top. The transmitted sequences from both antennas of transmitter 4 are depicted in FIG. 2.

With symbol rate sampling, $h_\mu:=[h_\mu(0); \ldots; h_\mu(L)]^T$ be the equivalent discrete-time channel impulse response (that includes transmit-receive filters as well as multipath effects) between the μth transmit antenna and the single receive antenna, where L is the channel order. With the CP length at least as long as the channel order, P−J=L, the inter block interference (IBI) can be avoided at the receiver by discarding the received samples corresponding to the cyclic prefix. CP insertion at the transmitter together with CP removal at the receiver yields the following channel input-output relationship in matrix-vector form: x(i)

$$x(i) = \sum_{\mu=1}^{2} \tilde{H}_\mu \bar{s}_\mu(i) + w(i), \quad (3)$$

where the channel matrix $\tilde{H}_\mu$ is circulant with $[\tilde{H}_\mu]_{p,q}=h_\mu((p-q) \bmod J)$, and the additive Gaussian noise w(i) is assumed to be white with each entry having variance $\sigma_w^2 = N_0$.

Receiver 8 can exploit the following two properties of circulant matrices:

p1) Circulant matrices can be diagonalized by FFT operations $$\tilde{H}_\mu = F_J^H D(\tilde{h}_\mu) F_J \text{ and } \tilde{H}_\mu^H D(\tilde{h}_\mu^*) F_J \text{ where } D(\tilde{h}_\mu) := \text{diag}(\tilde{h}_\mu), \quad (4)$$

$$\text{and } \tilde{h}_\mu := \left[ H_\mu(e^{j0}), H_\mu\left(e^{j\frac{2\pi}{J}}\right), \ldots, H_\mu\left(e^{j\frac{2\pi}{J}(J-1)}\right) \right]^T$$

with the pth entry being the channel frequency response $$H_\mu(z) := \sum_{l=0}^{L} h_\mu(l) z^{-l}$$

evaluated at the frequency $$z = e^{j\frac{2\pi}{J}(p-1)}.$$

p2) Pre- and post-multiplying $\tilde{H}_\mu$ by P yields $\tilde{H}_\mu^T$:

$$P\tilde{H}_\mu P = \tilde{H}_\mu^T \text{ and } P\tilde{H}_\mu^* P = \tilde{H}_\mu^H. \quad (5)$$

With the ST coded blocks satisfying (2), let us consider two consecutive received blocks [c.f (3)]:

$$x(2i) = H_1 \bar{s}_1(2i) + H_2 \bar{s}_2(2i) + w(2i), \quad (6)$$

$$x(2i+1) = -H_1 P \bar{s}^*_2(2i) + \tilde{H}_2 P \bar{s}^*_1(2i) + w(2i+1). \quad (7)$$

Left-multiplying (7) by P, conjugating, and using p2), we arrive at:

$$Px^*(2i+1) = -\tilde{H}_1^H \bar{s}_2(2i) + \tilde{H}_2^H \bar{s}_1(2i) + Pw^*(2i+1). \quad (8)$$

Notice that having permutation matrix P inserted at the transmitter allows the Hermitian of the channel matrices in (8) for enabling multi-antenna diversity gains with linear receiver processing.

We will pursue frequency-domain processing of the received blocks, which we described by multiplying the blocks x(i) with the FFT matrix $F_J$ that implements the J-point FFT of the entries in x(i). Let us define $y(2i) := F_J x(2i)$, $y^*(2i+1) := F_J Px^*(2i+1)$, and likewise $\bar{\eta}(2i)$: F, $w(2i)$ and $\bar{\eta}^*(2i+1) := F_J Pw^*(2i+1)$. For notational convenience, we also define the diagonal matrices $D_1 := D(\tilde{h}_1)$ and $D_2 := D(\tilde{h}_2)$ with the corresponding transfer function FFT samples on their diagonals. Applying the property p1) on (6) and (8), we obtain the FFT processed blocks as:

$$y(2i) = D_1 F_J \bar{s}_1(2i) + D_2 F_J \bar{s}_2(2i) + \bar{\eta}(2i), \quad (9)$$

$$y^*(2i+1) = -D_1^* F_J \bar{s}_2(2i) + D_2^* F_J \bar{s}_1(2i) + \bar{\eta}^*(2i+1). \quad (10)$$

It is important to remark at this point that permutation, conjugation, and FFT operations on the received blocks x(i) do not introduce any information loss, or color the additive noises in (9) and (10) that remain white. It is thus sufficient to rely only on the FFT processed blocks y(2i) and y*(2i+1) when performing symbol detection.

After defining $y(i) := [y^T(2i), y^H(2i+1)]^T$, we can combine (9) and (10) into a single block matrix-vector form to obtain:

$$y(i) = \underbrace{\begin{bmatrix} D_1 & D_2 \\ D_2^* & -D_1^* \end{bmatrix}}_{:=D} \begin{bmatrix} F_J s(2i) \\ F_J s(2i+1) \end{bmatrix} + \begin{bmatrix} \bar{\eta}(2i) \\ \bar{\eta}^*(2i+1) \end{bmatrix}, \quad (11)$$

where the identities $\bar{s}_1(2i) = s(2i)$ and $\bar{s}_2(2i) = s(2i+1)$ have been used following our design in (1).

Consider a J×J diagonal matrix $\bar{D}_2$ with non-negative diagonal entries as: $\bar{D}_{12} = [D_1^* D_1 + D_2^* D_2]^{1/2}$. We can verify that the matrix D in (11) satisfies $D^H D = I_2 \otimes \bar{D}_{12}^2$, where $\otimes$ stands for Kronecker product. Based on $D_1$ and $D_2$, we next construct a unitary matrix U. If $h_1$ and $h_2$ do not share common zeros on the FFT grid $$\{e^{j\frac{2\pi}{J}n}\}_{n=0}^{J-1},$$

then $\bar{D}_{12}$ is invertible, and we select U as $U := D(I_2 \otimes \bar{D}_{12}^{-1})$. If $h_1$ and $h_2$ happen to share common zero(s) on the FFT grid (although this event has probability zero), then we construct U as follows. Supposing without loss of generality that $h_1$ and $h_2$ share a common zero at the first subscriber $e^{j0}$, we have that $[D_1]_{1,1} = [D_2]_{1,1} = [\bar{D}_{12}]_{1,1} = 0$. We then construct a diagonal matrix $D'_1$ which differs from $D_1$ only at the first diagonal entry: $[D'_1]_{1,1} = 1$. Similar to the definition of D and $\bar{D}_{12}$, we construct D' and $\bar{D}'_{12}$ by substituting $D_1$ with $D'_1$. Because $\bar{D}'_{12}$ is invertible, we form $U := D'[I_2 \otimes (\bar{D}'_{12})^{-1}]$. In summary, no matter whether $\bar{D}_{12}$ is invertible or not, we can always construct a unitary U, which satisfies $U^H U = I_{2J}$ and $U^H D = I_2 \otimes \bar{D}_{12}$, where the latter can be easily verified. As multiplying by unitary matrices does not incur any loss of decoding optimality in the presence of additive white Gaussian noise, (11) yields $z(i) := [z^T(2i), z^T(2i+1)]^T$ as:

$$z(i) = U^H y(i) = \begin{bmatrix} \bar{D}_{12} F_J s(2i) \\ \bar{D}_{12} F_J s(2i+1) \end{bmatrix} + U^H \begin{bmatrix} \bar{\eta}(2i) \\ \bar{\eta}^*(2i+1) \end{bmatrix}, \quad (12)$$

where the resulting noise $\eta(i) := [\eta^T(2i), \eta^T(2i+1)]^T = U^H [\bar{\eta}^T(2i), \bar{\eta}^H(2i+1)]^T$ is still white with each entry having variance $N_0$.

We infer from (12) that the blocks (2i) and s(2i=1) can be demodulated separately without compromising the ML optimality, after linear receiver processing. Indeed, so far we applied at the receiver three linear unitary operations after the CP removal: i) permutation (via P); ii) conjugation and FFT (via $F_J$); and iii) unitary combining (via $U^H$). As a result, we only need to demodulate each information block d (i) separately from the following sub-blocks [c.f. (12)]:

$$z(i) = \bar{D}_{12} F_J s(i) + \eta(i) = \bar{D}_{12} F_J \Theta d(i) + \eta(i). \quad (13)$$

A. Diversity Gain Analysis

Let us drop the block index i from (13), and e.g., use d to denote d(i) for notational brevity. With perfect CSI at the receiver, we will consider the pairwise error probability (PEP)P(d→d'|$h_1$, $h_2$) that the symbol block d is transmitted, but is erroneously decoded as d'≠d. The PEP can be approximated using the Chernoff bound as $$P(s \to s'|h_1, h_2) \leq \exp(-d^2(z, z')/4N_0). \quad (14)$$

where $d(z, z')$ denotes the Euclidean distance between z and z'.

Define the error vector as $e := d - d'$, and a $J \times (L+1)$ Vandermonde matrix V with $[V]_{p,q} = \exp(-j2\pi pq/J)$. The matrix V links the channel frequency response with the time-domain channel taps as $\tilde{h}_\mu = V h_\mu$. Starting with (13), we then express the distance as:

$$d^2(z, z') = \|\overline{D}_{12} F_J \Theta e\|^2 \quad (15)$$
$$= e^H \Theta^H F_J^H \overline{D}_{12}^2 F_J \Theta e$$
$$= \sum_{\mu=1}^{2} \|D_\mu F_J \Theta e\|^2$$
$$= \sum_{\mu=1}^{2} \|D_e V h_\mu\|^2,$$

where $D_e := \text{diag}(F_J \Theta e)$ such that $d_\mu F_J \Theta e = D_e \tilde{h}_\mu = D_e V h_\mu$.

We focus on block quasi static channels, i.e., channels that remain invariant over each space-time coded block, but may vary from one block to the next. We further adopt the following assumption: as0) the channels $h_1$ and $h_2$ are uncorrelated; and for each antenna $\mu \in [1,2]$, the channel $h_\mu$ is zero-mean, complex Gaussian distributed, with covariance matrix $R_{h,\mu} := e\{h_\mu h_\mu^H\}$.

If the entries of $h_\mu$ are i.i.d., then we have $R_{h,\mu} = I_{L+1}/(L+1)$, where the channel covariance matrix is normalized to have unit energy; i.e., $\text{tr}\{R_{h,\mu}\} = 1$. Because general frequency selective multipath channels have covariance matrices with arbitrary rank, we define the "effective channel order" as: $\tilde{L}_\mu = \text{rank}(R_{h,\mu}) - 1$. Consider now the following eigen decomposition:

$$R_{h,\mu} = U_{h,\mu} \Lambda_{h,\mu} U_{h,\mu}^H, \quad (16)$$

where $\Lambda_{h,\mu}$ is an $(\tilde{L}_\mu+1) \times (\tilde{L}_\mu+1)$ diagonal matrix with the positive eigenvalues of $R_{h,\mu}$ on its diagonal, and $U_{h,\mu}$ is an $(L+1) \times (\tilde{L}_\mu+1)$ matrix having orthonormal columns: $U_{h,\mu}^H U_{h,\mu} = I_L \mu + 1$. Defining $$\overline{h}_\mu = \Lambda_{h,\mu}^{-\frac{1}{2}} U_{h,\mu}^H h_\mu,$$

we can verify that the entries of $\overline{h}_\mu$ are i.i.d. with unit variance. Since $h_\mu$ and $$U_{h,\mu} \Lambda_{h,\mu}^{\frac{1}{2}} \overline{h}_\mu$$

have identical distributions, we replace the former by the latter in the ensuing PEP analysis. A special case of interest corresponds to transmissions experiencing channels with full rank correlation matrices; i.e., rank $(R_{h,\mu}) = \tilde{L} + 1$ and $L_\mu = L$. As will be clear later on, a rich scattering environment leads to $R_{h,\mu}$'s with full rank, which is favorable in broadband wireless applications because it is also rich in diversity.

With the aid of the whitened and normalized channel vector $\overline{h}_\mu$, we can simplify (15) to:

$$d^2(z, z') = \left\|D_e V U_{h,1} \Lambda_{h,1}^{\frac{1}{2}} \overline{h}_1\right\|^2 + \left\|D_e V U_{h,2} \Lambda_{h,2}^{\frac{1}{2}} \overline{h}_2\right\|^2 \quad (17)$$

From the spectral decomposition of the matrix $A_{e,\mu}^H A_{e,\mu}$, where $$A_{e,\mu} := D_e V U_{h,\mu} \Lambda_{h,\mu}^{\frac{1}{2}},$$

we know that there exists a unitary matrix $U_{e,\mu}$, such that $U_{e,\mu}^H A_{e,\mu}^H A_{e,\mu} = \Lambda_{e,\mu}$ is diagonal with non-increasing diagonal entries collected in the vector $\lambda_{e,\mu} := [\lambda_{e,\mu}(0), \lambda_{e,\mu}(1), \ldots, \lambda_{e,\mu}(\tilde{L}_\mu)]^T$.

Consider now the channel vectors $\overline{h}'_\mu := U_{e,\mu}^H \overline{h}_\mu$, with identity correlation matrix. The vector $\overline{h}'_\mu$ is clearly zero-mean, complex Gaussian, with i.i.d entries. Using $\overline{h}'_\mu$, we can rewrite (17) as:

$$d^2(z, z') = \sum_{\mu=1}^{2} (\overline{h}'_\mu)^H U_{e,\mu}^H A_{e,\mu}^H A_{e,\mu} \overline{h}'_\mu \quad (18)$$
$$= \sum_{l=1}^{L_1} \lambda_{e,1}(l) |\overline{h}'_2(l)|^2 + \sum_{l=1}^{L_2} \lambda_{e,2}(l) |\overline{h}'_2(l)|^2.$$

Based on (18), and by averaging (14) with respect to the i.i.d. Rayleigh random variables $|\overline{h}'_1(l)|$, $|\overline{h}'_2(l)|$, we can upper bound the average PEP as follows:

$$P(s \to s') \leq \prod_{l=0}^{L_1} \frac{1}{1 + \lambda_{e,1}(l)/(4N_0)} \prod_{l=0}^{L_2} \frac{1}{1 + \lambda_{e,2}(l)/(4N_0)}. \quad (19)$$

If $r_{e,\mu}$ is the rank of $A_{e,\mu}$ (and thus the rank of $A_{e,\mu}^H A_{e,\mu}$) then $\lambda_{e,\mu}(l) \neq 0$ if and only if $l \in [0, r_{e,\mu}-1]$. It thus follows from (19) that $$P(s \to s') \leq \left(\frac{1}{4N_0}\right)^{-(r_{e,1}+r_{e,2})} \left(\prod_{l=0}^{r_{e,1}-1} \lambda_{e,1}(l) \prod_{l=0}^{r_{e,2}-1} \lambda_{e,2}(l)\right)^{-1}. \quad (20)$$

We call $r_e := r_{e,1} + r_{e,2}$ the diversity gain $G_{d,e}$, and $$\left[\prod_{l=0}^{r_{e,1}-1} \lambda_{e,1}(l) \prod_{l=1}^{r_{e,2}-1} \lambda_{e,2}(l)\right]^{1/r_e}$$

the coding gain $G_{c,e}$ of the system for a given symbol error vector e. The diversity gain $G_{d,e}$ determines the slope of the averaged (w.r.t. the random channel) PEP (between s and s') as a function of the signal to noise ration (SNR) at high SNR ($N_0 \to 0$). Correspondingly, $G_{c,e}$ determines the shift of this PEP curve in SNR relative to a benchmark error rate curve of $[1/(4N_0)]^{-r_e}$. Without relying on PEP to design (nonlinear) ST codes for flat fading channels, we here invoke PEP bounds to prove diversity properties of our proposed single-carrier block transmissions over frequency selective channels.

Since both $G_{d,e}$ and $G_{c,e}$ depend on the choice of e (thus on s and s'), we define the diversity and coding gains for our system, respectively, as:

$$G_d := \min_{e \neq 0} G_{d,e}, \text{ and } G_c := \min_{e \neq 0} G_{c,e}. \qquad (21)$$

Based on (21), one can check both diversity and coding gains. However, in this paper, we focus only on the diversity gain. First, we observe that the matrix $A_{e,\mu}^H A_{e,\mu}$ is square of size $(\tilde{L}_\mu 1)$. Therefore, the maximum achievable diversity gain in a two transmit- and one receive-antennae system is $$G_d = \sum_{\mu=1}^{2} (\tilde{L}_\mu + 1)$$

for FIR channels with effective channel order $\tilde{L}_\mu, \mu=1,2$, while it becomes $2(L+1)$ in rich scattering environments. This maximum diversity can be easily achieved by e.g., a simple redundant transmission where each antenna transmits the same symbol followed by L zeros in two non-overlapping time slots. We next examine the achieved diversity levels in our following proposed schemes, which certainly have much higher rate than redundant transmissions.

B. CP-Only

We term CP-only the block transmissions with no precoding: $\Theta=I_K$, J=K, and s(i)=d(i). The word "only" emphasizes that, unlike OFDM, no IFFT is applied at the transmitter. Let us now check the diversity order achieved by CP-only. The worst case is to select $d=a1_{J\times 1}$ and $d=a'1_{J\times 1}$ implying $e=(a-a')1_{J\times 1}$, where a, a'$\in$A. Verifying that for these error events, the matrix $D_c=\text{diag}(F_J e)$ has only one non-zero entry, we deduce that $r_{e,1}=r_{e,2}=1$. Therefore, the system diversity order achieved by CP-only is $G_d=2$. This is nothing but space-diversity of order two coming from the two transmit antennas [c.f. (13)]. Note that CP-only schemes suffer from loss of multipath diversity.

To benefit also form the embedded multipath-induced diversity, we have to modify our transmissions.

C. Linearly Precoded CP-Only

To increase our ST system's diversity order, transmitter 4 may utilize linear precoding developed originally for single-antenna transmissions. One can view CP-only as a special case of the linearly precoded CP-only system (denoted henceforth as LP-CP-only) with identity precoder. With s(i)=$\Theta$d(i) and carefully designed $\Theta \neq I_K$, we next show that the maximum diversity is achieved. We will discuss two cases: the first one introduces no redundancy because it uses J=K, while the second one is redundant and adopts J=K+L. For non-redundant precoding with J=K, it has been established that for any signal constellation adhering to a finite alphabet, there always exists a K×K unitary constellation rotating (CR) matrix ensuring $\Theta_{CR}$ that each entry of $\Theta_{CR}$ (d–d') is non-zero for any pair of (d, d'). We thus propose to construct $\Theta=F_K^H \Theta_{cr}$ such that $F_K\Theta=\Theta_{cr}$. With this construction, $D_e=\text{diag}(\Theta_{cr} e)$ is guaranteed to have non-zero entries on its diagonal, and thus it has full rank. Consequently, the matrix $D_c V$ has full column rank L+1, and $A_{c,\mu}=D_c V U_{h,\mu} \Lambda_{h,\mu}^{1/2}$ has full column rank $r_{e,\mu}=\tilde{L}_\mu+1$. Hence, the maximum achievable diversity order is indeed achieved.

We emphasize here that the non-redundant precoder $\Theta_{cr}$ is constellation dependent. For commonly used BPSK, QPSK, and all QAMs constellations, and for the block size K equal to a power of 2: $K=2^m$, one class of $\Theta_{cr}$ precoders with large coding gains is found to be:

$$\Theta_{cr}=F_K \Delta(\alpha), \text{ and thus, } \Theta=\Delta(\alpha), \qquad (22)$$

where $\Delta(\alpha):=\text{diag}(1, \alpha, \ldots, \alpha^{K-1})$ with $$\alpha \in \left\{ e^{j\frac{\pi}{2K}(1+4n)} \right\}_{n=0}^{K-1}.$$

For block size $K \neq 2^m$, one can construct $\Theta_{cr}$ by truncating a larger unitary matrix constructed as in (22). The price paid for our increased diversity gain is that LP-CP-only does not offer constant modulus transmissions, in general. However, by designing K to be a power of 2, and by choosing $\Theta$ as in (22), the transmitted signals s(i)=$\Delta(\alpha)$d(i) are constant modulus if d(i) are PSK signals. Therefore, by selecting K to be a power of 2, we can increase the diversity gain without reducing the power efficiency.

Alternatively, we can adopt a redundant J×K precoder $\Theta$ with J=K+L. Our criterion for selecting such tall precoding matrices $\Theta$ is to guarantee that $F_J\Theta$ satisfies the following property: any K rows of $F_J\Theta$ are linearly independent. One class of $F_J\Theta$ satisfying this property includes Vandermonde matrices $\Theta_{van}$ with distinct generators $[P_1, \ldots P_J]$, defined as:

$$\Theta_{van} = \frac{1}{\sqrt{J}} \begin{bmatrix} 1 & \rho_1^{-1} & \cdots & \rho_1^{-(K-1)} \\ \vdots & \vdots & \ddots & \vdots \\ 1 & \rho_J^{-1} & \cdots & \rho_J^{-(K-1)} \end{bmatrix}, \text{ and thus, } \Theta = F_J^H \Theta_{van}. \qquad (23)$$

With $F_J\Theta=\Theta_{van}$, we have that $\Theta_{van}e$ has at least (L+1) non-zero entries for any e regardless of the underlying signal constellation. Indeed, if $\Theta_{van}e$ has only L nonzero entries for some e, then it has K zero entries. Picking the corresponding K rows of $\Theta_{van}$ to form the truncated matrix $\overline{\Theta}_{van}$, we have $\overline{\Theta}_{van}e=0$, which shows that these K rows are linearly dependent, thus violating the design of the precoder $\Theta_{van}$. With $D_e=\text{diag}(\Theta_{van}e)$ having at least (L+1) nonzero entries, the matrix $D_e V$ has full rank because any L+1 rows of V are linearly independent. Thus, the maximum diversity gain is achieved with redundant precoding irrespective of the underlying constellation.

When J$\in$[K, K+L], constellation ireespective precoders are impossible because $\Theta$e can not have L+1 nonzero entries for any e that is unconstrained. Therefore, constellation independent precoders are not possible for J<K+L. However, with some redundancy J>K, the design of constellation-dependent precoders may become easier.

D. Affine Precoded CP-Only

Another interesting class of linear precoders implements an affine transformation: s(i)=$\Theta$d(i)+$\Theta$'b(i), where b(i) is a known symbol vector. In this paper, we are only interested in the special form of:

$$s(i) = T_1 d(i) + T_2 b(i) = \begin{bmatrix} d(i) \\ b(i) \end{bmatrix}, \quad (24)$$

where the precoder $\Theta = T_1$ is the first K columns of $I_J$, the precoder $\Theta = T_2$ is the last L columns of $I_J$, and the known symbol vector b has size L×1 with entries drawn from the same alphabet A. We henceforth term the transmission format in (24) as AP-CP-only. Notice that in this scheme, J=K+L and P=J+L.

Although here we place b(i) at the bottom of s(i) for convenience, we could also place b(i) at arbitrary positions within s(i). As long as L consecutive symbols are known as in s(i), all decoding schemes detailed in Section II are applicable.

Recall that the error matrix $D_e = \text{diag}(F_J T_1 e)$ does not contain known symbols. Since $F_J T_1$ is a Vandermonde matrix of the form (23), the maximum diversity gain is achieved, as discussed in Section I-C for redundant LP-CP-only.

In the CP-based schemes depicted in FIG. 2, the CP portion of the transmitted sequence is generally unknown, because it is replicated from the unknown data blocks. However, with AP-CP-only in (24), and with the specific choice of $P = P_J^{(K)}$, we have $P = P_J^{(K)} s(i) = [[P_K^{(0)} d(i)]^T, [P_L^{(0)} b(i)]^T]^T$, which implies that both the data block and the known symbol block are time reversed, but keep their original positions. The last L entries of $P_J^{(K)} s(i)$ are again known, and are then replicated as cyclic prefixes. For this special case, we depict the transmitted sequences in FIG. 3. In this format, the data block d(i) is surrounded by two known blocks, that correspond to the pre-amble and post-amble. Our general design based on the CP structure includes this known pre- and post-ambles as a special case. Notice that the pre-amble and post-amble have not been properly designed in some conventional systems. The consequence is that "edge effects" appear for transmissions with finite block length, and an approximation on the order of O(L/J) has to be made in order to apply Viterbi's decoding algorithm. This approximation amounts to nothing but the fact that a linear convolution can be approximated by a circular convolution when the block size is much larger than the channel order. By simply enforcing a CP structure to obtain circulant convolutions, Viterbi's algorithm can be applied to our proposed AP-CP-only with no approximation whatsoever, regardless of the block length and the channel order, as will be clear soon.

E. ZP-Only

Figure 3:
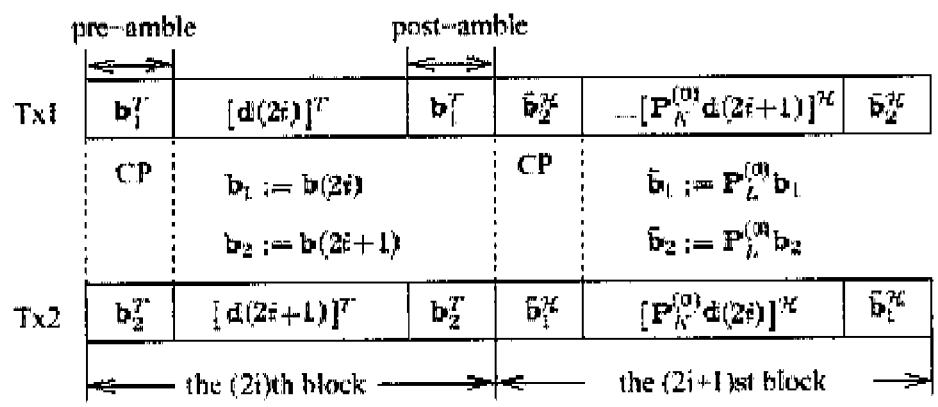
Figure 4:
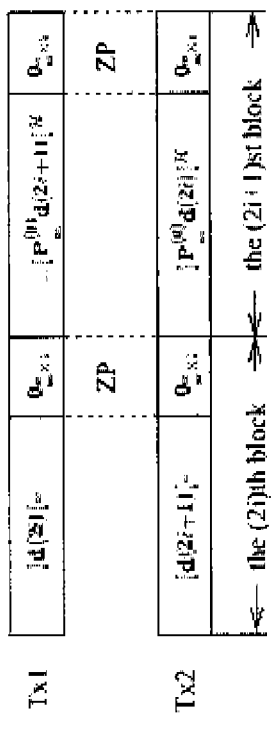
FIG. 4 is another example transmission format for the transmitter of FIG. 1.

Suppose now that in AP-CP-only, we let b(i)=0 instead of having known symbols drawn from the constellation alphabet, and we fix $P = P_J^{(K)}$. Now, the adjacent data blocks are guarded by two zero blocks, each having length L, as depicted in FIG. 3. Since the channel has only order L, presence of 2L zeros in the middle of two adjacent data blocks is not necessary. Keeping only a single block of L zeros corresponds to removing the CP-insertion operation at the transmitter. On the other hand, one could view that the zero block in the previous block serves as the CP for the current block, and thus all derivations done for CP-based transmissions are still valid. The resulting transmission format is shown in FIG. 4, which achieves higher bandwidth efficiency than AP-CP-only. We term this scheme as ZP-only, where J=K+L and P=J.

By mathematically viewing ZP-only as a special case of AP-CP-only with b(i)=0, it is clear that the maximum diversity is achieved. In addition to the rate improvement, ZP-only also saves the transmitted power occupied by CP and known symbols.

For convenience, we list all aforementioned schemes in Table 1, assuming a rich scattering environment. Power loss induced by the cyclic prefix and the known symbols, is also considered. It certainly becomes negligible when K>>L.

F. Links with Multicarrier Transmissions

In this section, we link single carrier with digital multicarrier (OFDM based) schemes. We first examine the transmitted blocks on two consecutive time intervals. For LP-CP-only, the transmitted space-time matrix is:

$$\begin{bmatrix} u_1(2i) & u_1(2i+1) \\ u_2(2i) & u_2(2i+1) \end{bmatrix} = \quad (25)$$

$$\begin{bmatrix} T_{cp}\Theta d(2i) & -T_{cp}P\Theta^* d^*(2i+1) \\ T_{cp}\Theta d(2i+1) & T_{cp}P\Theta^* d^*(2i) \end{bmatrix} \begin{array}{l} \rightarrow \text{time} \\ \downarrow \text{space} \end{array},$$

If let $P = P_J^{(1)}$ and $\Theta = F_J^H \psi$, we obtain for a general matrix $\psi$.

$$\begin{bmatrix} u_1(2i) & u_1(2i+1) \\ u_2(2i) & u_2(2i+1) \end{bmatrix} = \quad (26)$$

$$\begin{bmatrix} T_{cp} F_J^H \psi d(2i) & -T_{cp} F_J^H \psi^* d^*(2i+1) \\ T_{cp} F_J^H \psi d(2i+1) & T_{cp} F_J^H \psi^* d^*(2i) \end{bmatrix} \begin{array}{l} \rightarrow \text{time} \\ \downarrow \text{space} \end{array}$$

TABLE 1

SUMMARY OF SINGLE CARRIER SCHEMES IN RICH-SCATTERING ENVIRONMENTS

|  | Rate R | Diversity $G_d$ | Power Loss (dB) | Features |
| --- | --- | --- | --- | --- |
| CP-Only | $\frac{K}{K+L}\log_2|A|$ | 2 | $10\log_{10}\frac{K+L}{K}$ | Constant modulus (C-M)* |
| non-redundant LP-CP-only | $\frac{K}{K+L}\log_2|A|$ | 2(L + 1) | $10\log_{10}\frac{K+L}{K}$ | Constellation-specific precoder constant modulus |
| redundant LP-CP-only | $\frac{K}{K+2L}\log_2|A|$ | 2(L + 1) | $10\log_{10}\frac{K+L}{K}$ | Constellation-independent Not C-M general |
| AP-CP-only | $\frac{K}{K+2L}\log_2|A|$ | 2(L + 1) | $10\log_{10}\frac{K+2L}{K}$ | Constellation-independent constant modulus |

TABLE 1-continued

SUMMARY OF SINGLE CARRIER SCHEMES IN RICH-SCATTERING ENVIRONMENTS

| | Rate R | Diversity $G_d$ | Power Loss (dB) | Features |
|---|---|---|---|---|
| ZP-only | $\frac{K}{K+L}\log_2|A|$ | $2(L+1)$ | 0 | Constellation-independent C-M except zero guards |

-only if information symbols have constant-modules, e.g. drawn from PSK constellations.

If $\Psi = I_K$, then (26) corresponds to the space-time block coded OFDM proposed in Y. Li, J. C. Chuang, and N. R. Sollenberger, "Transmitter diversity for OFDM systems and its impact on high-rate data wireless networks," IEEE Journal on Selected Areas in Communications, vol. 17, no. 7, pp. 1233-1243, July 1999. Designing $\Psi \neq I_K$ introduces linear precoding across OFDM subcarriers, as proposed in other conventional techniques. Therefore, LP-CP-only includes linear precoded space-time OFDM as a special case by selecting the precoder $\Phi$ and the permutation P appropriately. Although linear precoding has been proposed for space time OFDM systems, the diversity analysis has not been provided. The link we introduce here reveals that the maximum diversity gain is also achieved by linearly precoded ST-OFDM with the Vandermonde precoders.

Interestingly, linearly precoded OFDM can even be converted to zero padded transmissions. Indeed, choosing $\psi$ to be the first K columns of $F_J$, we obtain the transmitted block as: $u(i) = T_{cp} F_J^H \psi d(i) = [0_{L \times 1}^T, d^T(i), 0_{L \times 1}^T]^T$, which inserts zeros both at the top and at the bottom of each data block.

G. Capacity Result

We now analyze the capacity of the space time block coding format of (1). The equivalent channel input-output relationship, after receiver processing, is described by (13) as: $z = \overline{D} F_J s + \eta$, where we drop the block index for brevity. Let $I(z:s)$ denote the mutual information between z and s, and recall that $I(z:s)$ is maximized when s is Gaussian distribute. Due to the lack of channel knowledge at the transmitter, the transmission power is equally distributed among symbols, with $R_s = E\{ss^H\} = \sigma_s^2 I_J$. Taking into account the CP of length L, the channel capacity, for a fixed channel realization, is thus:

$$C_J = \frac{1}{J+L} \max I(z:s) = \frac{1}{J+L} \log_2 \det\left(I_J + \frac{\sigma_s^2}{N_0} \overline{D}_{12} F_J F_J^H \overline{D}_{12}\right) = \qquad (27)$$

$$\frac{1}{J+L} \sum_{n=0}^{J-1} \log_2\left(1 + \frac{\sigma_s^2}{N_0}\left(\left|H_1\left(c^{j\frac{2\pi n}{J}}\right)\right|^2 + \left|H_2\left(c^{j\frac{2\pi n}{J}}\right)\right|^2\right)\right).$$

Define $E_s = 2\sigma_s^2$ as the total transmitted power from two antennas per channel use. As the block size J increases, we obtain $$C_{J \to \infty} = \int_0^1 \log_2\left(1 + \frac{E_s}{2N_0}\left(|H_1(e^{j2\pi f})|^2 + |H_2(e^{j2\pi f})|^2\right)\right) df. \qquad (28)$$

The capacity for frequency selective channels with multiple transmit and receive antennas has been described with conventional techniques. The result in (28) coincides with that of some of these techniques when we have two transmit antennas and one receive antenna. Therefore, our proposed transmission format in (1) does not incur capacity loss in this special case. This is consistent with techniques where the Alamouti coding is shown to achieve capacity for frequency-flat fading channels with such an antenna configuration. To achieve capacity for systems with two transmit antennas and a single receive antenna, it thus suffices to deploy suitable one-dimensional channel codes, or scalar codes.

II. Equalization and Decoding

Let $\overline{z}(i) := z(i)$ for CP-only, LP-CP-only, ZP-only, and $\overline{z}(i) := z(i) - \overline{D}_{12} F_J T_2 b(i)$ for AP-CP-only. With this convention, we can unify the equivalent system output after the linear receiver processing as:

$$\overline{z}(i) = F_J \Theta d(i) + \eta(i) = A d(i) + \eta(i), \qquad (29)$$

where $A := F_J \Theta$, the noise $\eta(i)$ is white with covariance $\sigma_w^2 I_J$ and the corresponding $\Theta$ is defined as in Section 1.

Brute-force ML decoding applied to (29) requires $|A|^K$ enumerations, which becomes certainly prohibitive as the constellation size $|A|$ and/or the block length K increases. A relatively faster near-ML search is possible with the sphere decoding (SD) algorithm, which only searches for vectors that are within a sphere centered at the received symbols. The theoretical complexity of SD is polynomial in K, which is lower than exponential, but still too high for K>16. Only when the block size K is small, the SD equalizer can be adopted to achieve near-ML performance at a manageable complexity. The unique feature of SD is that the complexity does not depend on the constellation size. Thus, SD is suitable for systems with small block size K, but with large signal constellations.

We now turn our attention to low-complexity equalizers by trading off performance with complexity. Linear zero forcing (ZF) and minimum mean square error (MMSE) block equalizers certainly offer low complexity alternatives. The block MMSE equalizer is:

$$\Gamma_{mmse} = (A^H A + \sigma_w^2 / \sigma_s^2 I_K)^{-1} A^H, \qquad (30)$$

where we have assumed that the symbol vectors are white with covariance matrix $R_s = E\{s(i)s^H(i)\} = \sigma_x^2 I_K$. The MMSE equalizer reduces to the ZF equalizer by setting $\sigma_w^2 = 0$ in (30).

For non-redundant LP-CP-only with $\Theta = \Delta(\alpha)$, we further simplify (30) to $$\Gamma_{mmse} = \Delta(\alpha^*) F_K^H [\overline{D}_{12}^2 + \sigma_w^2 / I_K]^{-1} \overline{D}_{12}, \qquad (31)$$

A. ML Decoding for AP-CP-Only and ZP-Only

For AP-CP-only and ZP-only, we have $$z = \overline{D}_{12} F_J s + \eta. \qquad (32)$$

where we drop the block index i for simplicity. Distinct from other systems, AP-CP-only and ZP-only assure that s has the last L entries known, and the first K entries drawn from the finite alphabet A.

In the presence of white noise, ML decoding can be expressed as:

$$\hat{s}_{ML} = \arg\max l_n P(z/s) = \arg\max \{-\|z - \overline{D}_{12} F_J s\|^2 / N_0\}. \quad (33)$$

We next simplify (33), starting with $$-\|z - \overline{D}_{12} F_J s\|^2 = 2 Re\{s^H F_J^H \overline{D}_{12} z\} - s F_J^H \overline{D}_{12}^2 F_J s - z^H z = \quad (34)$$

$$2 Re\{s^H r\} - \sum_{\mu=1}^{2} \|\overline{H}_\mu s\|^2 - z^H z,$$

where $r := F_J^H \overline{D}_{12} z$. We let $r_n := [r]_n$ and $s_n := [s]_n$. Recognizing that $\overline{H}_\mu s$ expresses nothing but a circular convolution between the channel h and s, we have $$[\overline{H}_\mu s]_n = \sum_{l=0}^{L} h_\mu(l) s_{(n-l \bmod J)}.$$

Hence, we obtain:

$$\hat{s}_{ML} = \quad (35)$$

$$\arg\max \sum_{n=0}^{J-1} \left\{ \frac{1}{N_0} \left[ 2 Re\{s_n^* r_n\} - \sum_{\mu=1}^{2} \left| \sum_{l=0}^{L} h_\mu(l) s_{(n-l) \bmod J} \right|^2 \right] \right\}.$$

For each $=0, 1, \ldots, J$, let us define a sequence of state vectors as: $\zeta_n = [s_{(n-1) \bmod J}, \ldots, S_{(n-L) \bmod J}]^T$ out of which the first and the last states are known: $\zeta_0 = \zeta_J [s_{(J-1)}, \ldots, s_{(J-L)}]^T$. The symbol sequence $s_0, \ldots, S_{J-1}$ determines an unique path evolving from the known state $\zeta_0$ to the known final state $\zeta_J$. Thus, Viterbi's algorithm is applicable. Specifically, we have:

$$\hat{s}_{ML} = \arg\max \sum_{n=0}^{J-1} f(\zeta_n, \zeta_{n+1}), \quad (36)$$

where $f(\zeta_n, \zeta_{n+1})$ is the branch metric, that is readily obtainable form (35). The explicit recursion formula for Viterbi's Algorithm is well known.

We now simplify the branch metric further. We first have $$\sum_{\mu=1}^{2} \|\overline{H}_\mu s\|^2 = s^H \sum_{\mu=1}^{2} (\overline{H}_\mu^H \overline{H}_\mu) s. \text{ The matrix } \overline{H} := \quad (37)$$

$$\sum_{\mu=1}^{2} (\overline{H}_\mu^H \overline{H}_\mu) \text{ has } (p,q)\text{th entry: } [\overline{H}]_{p,q} =$$

$$\sum_{\mu=1}^{2} \sum_{n=0}^{J-1} h_\mu^*((k-p) \bmod J) h_\mu((k-q) \bmod J)$$

Let us now select J>2L, and define $$\beta_n = \sum_{\mu=1}^{2} \sum_{l=0}^{L} h_\mu^*(l) h_\mu(n+l), \text{ for } n = 0, 1, \ldots, L. \quad (38)$$

It can be easily verified that the first column of $\overline{H}$ is $[\beta_0, \beta_1, \ldots, \beta_L, 0, \beta_L, \ldots, \beta_1^*]^T$. Let $\tilde{H}$ denote the circulant matrix with first column $[(1/2)\beta_0, \beta_1, \ldots, \beta_L, 0, \ldots, 0]^T$. Because $\overline{H}$ is circulant and Hermitian, $\overline{H}$ can be decomposed into: $\overline{H} = \tilde{H} + \tilde{H}^H$. We thus obtain $s^H \overline{H} s = 2 Re\{s^H \tilde{H} s\}$. Recognizing $$[\tilde{H} s]_n = (1/2) \beta_0 s_n + \sum_{l=1}^{L} \beta_l s_{(n-l) \bmod J},$$

and combining with (35), we obtain a simplified metric as:

$$f(\zeta_n, \zeta_{n-1}) = \frac{2}{N_0} Re\left\{ s_n^* \left[ r_n - \frac{1}{2} \beta_0 s_n - \sum_{l=1}^{L} \beta_l s_{(n-l) \bmod J} \right] \right\}. \quad (39)$$

The branch metric in (39) has a format analogous to the one proposed by Ungerboeck for maximum-likelihood sequence estimation (MLSE) receivers with single antenna serial transmissions. For multi-antenna block coded transmissions, a similar metric has been suggested in conventional systems. The systems, however, can suffer from "edge effects" for transmissions with finite block length, resulting an approximation on the order of O (L/J), while our derivation here is exact. Our CP based design assures a circular convolution, while the linear convolution in some conventional systems approximates well a circulant convolution only when J>>L. Note also that we allow for an arbitrary permutation matrix P, which includes the time-reversal in as a special case. Furthermore, a known symbol vector b can be placed in an arbitrary position within the vector s for AP-CP-only. If the known symbols occupy positions B–L, . . . , B–1, we just need to redefine the states as $\zeta_n = [s_{(n+B-1)} \bmod J, \ldots, s_{(n+B-L) \bmod J}]^T$.

Notice that for channels with order L, the complexity of Viterbi's algorithm is $O(|A|^L)$ per symbol; thus, ML decoding with our exact application of Viterbi's algorithm should be particularly attractive for transmissions with small constellation size, over relatively short channels.

B. Turbo Equalization for Coded AP-CP-Only and ZP-Only

Figure 5:
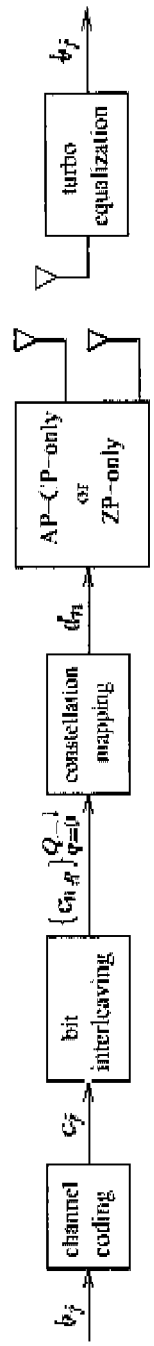
FIG. 5 is an example communication system using channel coding with the space-time coded transmission techniques in accordance with the principles of the invention.

So far, we have only considered uncoded systems, and established that full diversity is achieved. To further improve system performance by enhancing also coding gains, conventional channel coding can be applied to our systems. For example, outer convolutional codes can be used in AP-CP-only and ZP-only, as depicted in FIG. 5. Other codes such as TCM and turbo codes are applicable as well.

In the presence of frequency selective channels, iterative (turbo) equalization is known to enhance system performance, at least for single antenna transmissions. We here derive turbo equalizers for our coded AP-CP-only and ZP-only multi-antenna systems.

To enable turbo equalization, one needs to find a posteriori probability on the transmitted symbols S, based on the received vector z. Suppose each constellation point $s_n$ is determined by $Q = \log_2 |A|$ bits $\{c_{n,0}, \ldots c_{n,Q-1}\}$. Let us consider the log likelihood ratio (LLR):

$$\mathcal{L}_{n,q} = l_n \frac{P(c_{n,q} = +1 \mid z)}{P(c_{n,q} = -1 \mid z)}, \forall n \in [0, J-1], q \in [0, Q-1]. \quad (40)$$

The log-likelihood ratio in (40) can be obtained by running two generalized Viterbi recursions: one in the forward direction and one in the backward direction period. Our branch metric is modified as follows:

$$g(\zeta_n, \zeta_{n+1}) = f(\zeta_n, \zeta_{n+1}) + 1 n P(\zeta_{n+1} \mid \zeta_n).$$

This modification is needed to take into account the a priori probability $P(\zeta_{n+1} \mid \zeta_n)$, determined by the extrinsic information from the convolutional channel decoders during the turbo iteration. When the transition from $\zeta_n$ to $\zeta_{n+1}$ is caused by the input symbol $s_n$, we have $l_n P(\zeta_{n+1} \mid \zeta_n) = l_n P(s_n)$. We assume that the bit interleaver in FIG. 5 renders the symbols $s_n$ independent and equal likely, such that ln $$P(s_n) = \sum_{q=0}^{Q-1} \ln P(c_{n,q}),$$

which in turn can be determined by the LLRs for bits $\{c_{n,q}\}_{q=0}^{Q-1}$.

Finally, we remark that one could also adopt the known turbo decoding algorithm that is based on MMSE equalizers. This iterative receiver is applicable not only to AP-CP-only and ZP-only, but also to CP-only and LP-CP-only systems.

C. Receiver Complexity

Omitting the complexity of permutation and diagonal matrix multiplication, the linear processing to reach (13) only requires one size-JFFT per block, which amounts to $O(\log_2 J)$ per information symbol.

Channel equalization is then performed based on (13) for each block. We notice that the complexity is the same as the equalization complexity for single antenna block transmissions over FIR channels [43]. We refer the readers to [43] for detailed complexity comparisons of the different equalization options. For coded AP-CP-only and ZP-only, the complexity of turbo equalization is again the same as that of single antenna transmissions [13].

In summary, the overall receiver complexity for the two transmit antenna case is comparable to that of single antenna transmissions, with only one additional FFT per data block. This nice property originates from the orthogonal space-time block code design, that enables linear ML processing to collect antenna diversity. Depending desirable/affordable diversity-complexity tradeoffs, the designer is then provided with the flexibility to collect extra multipath-diversity gains.

III. Extension to Multiple Antennas

In Section I, we focused on $N_t=2$ transmit- and $N_r=1$ receive-antennae. In this section, we will extend our system design to the general case with $N_t \geq 2$ and/or $N_r \geq 1$ antennas. For each $\mu=1, \ldots, N_t$ and $\nu=1, \ldots, N_r$ we denote the channel between the $\mu$th transmit- and the $\nu$th receive-antennae as $h_{\mu\nu}=[h_{\mu\nu}(0), \ldots, h_{\mu\nu}(L)]^T$, and as before we model it as a zero-mean, complex Gaussian vector with covariance matrix $R_{h,\mu\nu}$. Correspondingly, we define the effective channel order $\overline{L}_{\mu\nu}:=\text{rank}\{R_{h,\mu\nu}\}-1$, which for a sufficiently rich scattering environment becomes $\overline{L}_{\mu\nu}=L$.

Transmit diversity with $N_t>2$ has been addressed in for OFDM based multicarrier transmissions over FIR channels by applying the orthogonal ST block codes of on each OFDM subcarrier. Here, we exten the orthogonal designs to single carrier block transmissions over frequency selective channels.

We will review briefly generalized orthogonal designs to introduce notation, starting with the basic definitions given in the context of frequency-flat channels:

Definition 1: Define $x:=[\chi_1, \ldots \chi_{N_s}]^T$, and let $G_r(x)$ be an $N_d \times N_t$ matrix with entries $0, \pm \chi_1, \ldots \pm \chi_{N_s}$. If $G_r^T(x) g G_r(x) = \alpha(\chi_1^2 + \ldots + \chi_{n_s}^2) I_{N_t}$ with $\alpha$ positive, then $G_r(x)$ is termed a generalized real orthogonal design (GROD) in variables $\chi_1, \ldots, \chi_{N_d}$ of size $N_d \times N_t$ and rate $R=N_s/N_d$.

Definition 2: Define $x:=[\chi_1, \ldots, \chi_{N_s}]^T$, and let $G_c(x)$ be an $N_d \times N_t$ matrix with entries $0, \pm \chi_1, \pm \chi^*_1, \ldots, \pm \chi_{N_s}$. If $G_c^H(x) G_c(x) = \alpha(|\chi_1|^2 + \ldots + |\chi_{n_s}|^2) I_{N_t}$ with $\alpha$ positive, then $G_c(x)$ is termed a generalized real orthogonal design (GCOD) in variables $\chi_1, \ldots, \chi_{N_s}$ of size $N_d \times N_t$ and rate $R=N_s/N_d$.

Explicit construction of $G_r(x)$ with R=1 was discussed in [34], where it was also proved that the highest rate for $G_c(x)$ is ½ when $N_t>4$. When $N_t=354$, there exist some sporadic codes with rate R=¾. Although the orthogonal designs with R=¾ for $N_t=3$, 4 have been incorporated for multicarrier transmissions, we will not consider them in our single carrier block transmissions here; we will only consider R=½GCOD designs primarily because GCOD $G_c(x)$ of R=½ can be constructed using the following steps ($N_s=4$ for $N_t=3,4$, while $N_s=8$ for $N_t=f6,7,5,8$[34]):

s1) construct GROD $G_r(x)$ of size $N_s \times N_t$ with R=1;

s2) replace the symbols $\chi_1, \ldots, \chi_{N_s}$ in $G_r(x)$ by their conjugates $\chi^*_1, \ldots \chi^*_{N_s}$ to arrive at $G_r(x^*)$;

s3) form $G_c(x)=[G_r^T(x), G_r^T(x^*)]^T$.

As will be clear soon, we are explicitly taking into account the fact that all symbols from the upper-part of $G_c(x)$ are un-conjugated, while all symbols from the lower-part are conjugated. The rate loss can be as high as 50% when $N_t>2$.

With $N^t>2$, the space-time mapper takes $N_s$ consecutive blocks to output the following $N_dJ \times N_d$ space time coded matrix ($N_d=2N_s$)

$$\overline{S}(i) = \varepsilon\{s(iN_s), \ldots, s(iN_s + N_s - 1)\} = \begin{bmatrix} \overline{s}_1(iN_d) & \cdots & \overline{s}_1(iN_d + N_d - 1) \\ \vdots & \ddots & \vdots \\ \overline{s}_{Nt}(iN_d) & \cdots & \overline{s}_{Nt}(iN_d + N_d - 1) \end{bmatrix} \begin{array}{l} \rightarrow \text{time} \\ \\ \downarrow \text{space}. \end{array} \quad (42)$$

The design steps are summarized as follows:

d1) construct $G_c$ of size $2N_s \times N_t$ in the variables $\chi_1, \ldots \chi_{N_s}$, as in s1)–s3);

d2) Replace $\chi_1, \ldots, \chi_{N_s}$ in $G_c^T$ by $s(iN_s), \ldots s(iN_s+N_s-1)$;

d3) Replace $\chi^*_1, \ldots, \chi^*_{N_s}$ in $G_c^T$ by $Ps^*(iN_s), \ldots, Ps^*(iN_s+N_s-1)$, where P is taken properly for different schemes as explained in Section 1.

At each block transmission slot i, $\underline{s}_\mu(i)$ is forwarded to the $\mu$th antenna, and transmitted through the FIR channel after CP insertion. Each receive antenna processes blocks independently as follows: The receiver removes the CP, and collects $N_d=2N_s$ blocks $x(iN_d), \ldots, x(iN_d+N_d-1)$. Then FFT is performed on the first Ns blocks $x(iN_d), \ldots, x(iN_d+N_d-1)$, while permutation and conjugation is applied to the last $N_s$ blocks: $Px^*(iN_d+N_s), \ldots, Px^*(iN_d+N_d-1)$, followed by FFT processing. Coherently combining the FFT outputs as we did for the two antennae cases to derive (13), we obtain on each antenna the equivalent output after the optimal linear processing:

$$z_v(i) = \overline{D}_v F_J s(i) + \eta_v(i), \quad (43)$$

$$\text{where } \overline{D}_v := \left[\sum_{\mu=1}^{N_t} D^*_{\mu,v} D_{\mu,v}\right]^{1/2} \text{ and } D_{\mu v} := \text{diag}(\overline{h}_{\mu v}) = \text{diag}(V h_{\mu v}).$$

We next stack the $z_v(i)$ blocks to form $\overline{z}(i) = [z_1^T(i), \ldots, z_{N_r}^T(i)]^T$ (likewise for $\overline{\eta}(i)$), and define $B := [\overline{D}_1, \ldots, \overline{D}_{N_r}]^T$, to obtain: $\overline{z}(i) = BF_J s(i) + \overline{\eta}(i)$. Defining $$\overline{B} := \left[\sum_{\mu=1}^{N_t} \sum_{v=1}^{N_r} D^*_{\mu,v} D_{\mu v}\right]^{1/2},$$

we have $B^H B = \overline{B}^2$. Therefore, we can construct a matrix $U_b = B \overline{B}^{-1}$, which has orthonormal columns $U_b^H U_b = I_J$, and satisfies $U_b^H B = \overline{B}$. As $U_b$ and B share range spaces, multiplying $U_b^H$ by $\overline{z}(i)$ incurs no loss of optimality, and leads to the following equivalent block:

$$z(i) := U_b^H \overline{z}(i) = \overline{B} F_J s(i) + \eta(i), \quad (44)$$

where the noise $\eta(i)$ is still white. Now the distance between z and z', corresponding to two different symbol blocks d and d', becomes:

$$d^2(z, z') = \sum_{\mu=1}^{N_t} \sum_{v=1}^{N_r} \|D_c V h_{\mu v}\|^2. \quad (45)$$

Comparing (45) with (15), the contribution now comes from $N_t N_r$ multipath channels. Following the same steps as in Section I, the following result can be established:

Proposition 1: The maximum achievable diversity order is $$\sum_{\mu=1}^{N_t} \sum_{v=1}^{N_r} (\overline{L}_{\mu v} + 1)$$

with $N_t$ transmit- and $N_r$ receive-antennas, which equals $N_t N_r (L+1)$ when the channel correlation has full rank.

1. CP-only achieves multi-antenna diversity of order $N_t N_r$;

2. LP-CP-only achieves the maximum diversity gain through either non-redundant but constellation-dependent or redundant but constellation-independent precoding;

3. Affine precoded CP-only and ZP-only achieve the maximum diversity gain irrespective of the underlying signal constellation.

The linear ML processing to reach (44) requires a total of $N_t N_r = 2N_r$ FFTs corresponding to each space-time coded block of (42), which amounts to $2N_r$ FFTs per information block. Channel equalization based on (44) incurs identical complexity as in single antenna transmissions. For AP-CP-only and ZP-only, the ML estimate $\hat{s}_{ML} = \arg\max (-\|z - \overline{B}Fs\|^2/N_0)$ can be obtained via exact application of Viterbi's algorithm. Relative to the two antenna case detailed in Section II-A, we can basically use the same expression for the branch metric of (39), with two modifications, namely: $r_n = [r]_n$ with $r = F_J^H \overline{B} z$, and $$\beta_n = \sum_{\mu=1}^{N_t} \sum_{v=1}^{N_r} \sum_{l=0}^{L} h^*_{\mu v}(l) h_{\mu v}(n+1), \text{ for } n = 0, 1, \ldots, L. \quad (46)$$

We summarize the general complexity results of this section and those of Section II in the following.

Proposition 2: The proposed space-time block coded CP-only, LP-CP-only, AP-CP-only and ZP-only systems with $N_t > 2(N_t = 2)$ transmit- and $N_r$ receive-antennas require an additional complexity of $O(2N_r \log_2 J)$ (respectively, $O(N_r \log_2 J)$) per information symbol, relative to their counterparts with single transmit- and single receive-antenna, where J is the FFT size.

IV. Simulated Performance

In this section, we present simulation results for systems with two transmit- and one receive-antenna. For ease in FFT processing, we always choose the block size J to be a power of 2. In all figures, we define SNR as the average received symbol energy to noise ratio at the receive antenna. For reference, we also depict the (outage) probability that the channel capacity is less than the desired rate, so that reliable communication at this rate is impossible. Specifically, we calculate (28) numerically, we evaluate the outage probability at the targeted rate R as $P(C_{J\to\infty} < R)$ with Monte-Carlo simulations.

Figure 6:
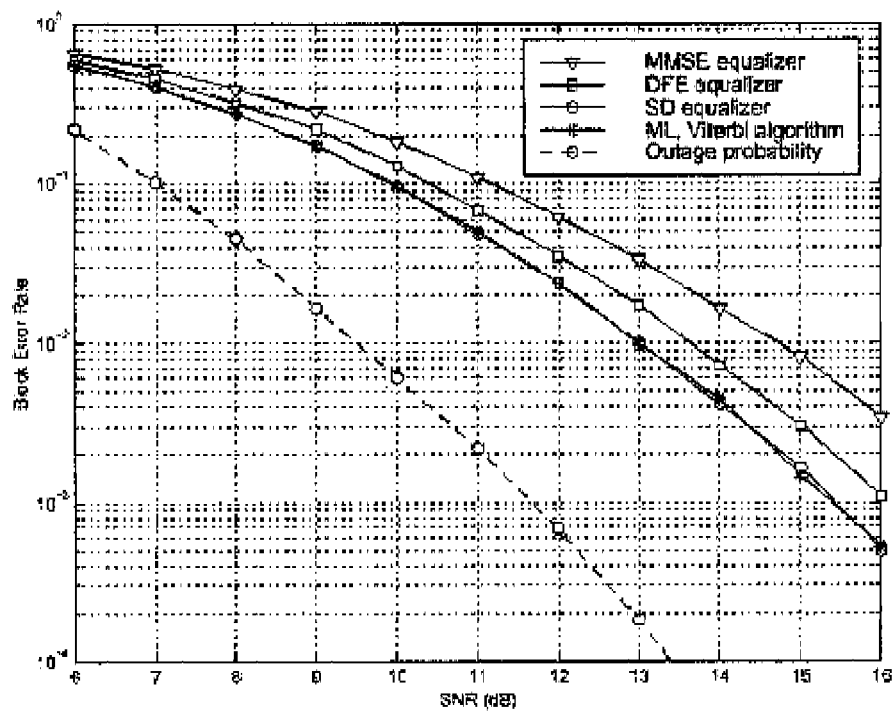
FIGS. 6-9 are graphs illustrating simulated performance results for systems with two transmit and one receive antenna.
Figure 7:
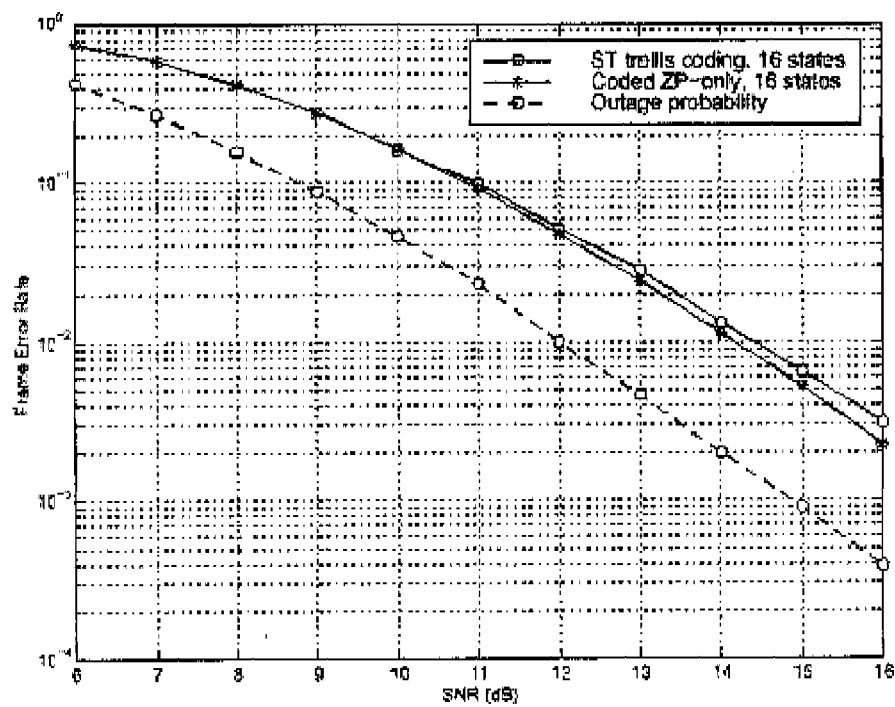

Test Case 1 (comparisons for different equalizers): We first set L=2, and assume that the channels between each transmit and each receive antenna are i.i.d., Gaussian, with covariance matrix $I_{L+1}/(L+1)$. We investigate the performance of ZP-only with block sizes: K=14, and P=J=16. We adopt QPSK constellations. FIG. 6 depicts the block error rate performance corresponding to MMSE, DFE, SD, and ML equalizers. We observe that the SD equalizer indeed achieves near-ML performance, and outperforms the suboptimal block DFE as well as the block MMSE alternatives. Without channel coding, the performance of ZP-only is faraway from the outage probability at rate 2K/(K+L)=1.75 bits per channel use.

Test Case 2 (convolutionally coded ZP-only): We here use two i.i.d. taps per FIR channel, i.e., L=1. We set the block sizes as K=127, P=J=128 for our ZP-only system, and use 8-PSK constellation. For convenience, we view each block of length P=128 as one data frame, with the space time codes applied to two adjacent frames. Within each frame, the information bits are convolutionally coded (CC) with a 16-state rate 2/3 encoder. Omitting the trailing bits to terminate the CC trellis, and ignoring the rate loss induced by the CP since L<<K, we obtain a transmission rate of 2 bits per channel use.

Turbo decoding iterations are performed. With the 16-state convolutional code, the frame error rate for ZP-only is within 2.3 dB away from the outage probability.

Test Case 3 (convolutionally coded AP-CP-only over EDGE channels): We test the

Typical Urban (TU) channel with a linearized GMSK transmit pulse shape, and a symbol duration T=3.69 μs as in the proposed third generation TDMA cellular standard EDGE (Enhance Date Rates for GSM Evolution). The channel has order L=3 and correlated taps. We use QPSK constellations, and set the block size J=128. We adopt AP-CP-only that guarantees perfectly constant modulus transmissions. Within each frame of 128 symbols, the last 3 are known. Information bits are coded using a 16-state rate ½ convolutional code. Taking into account the known symbols, the cyclic prefix, and zero bits to terminate the CC trellis, the overall transmission rate of the proposed AP-CP-only is (128−3−4)/(128+3)=0.924 bits per channel use, or 250.4 kbps.

Figure 8:
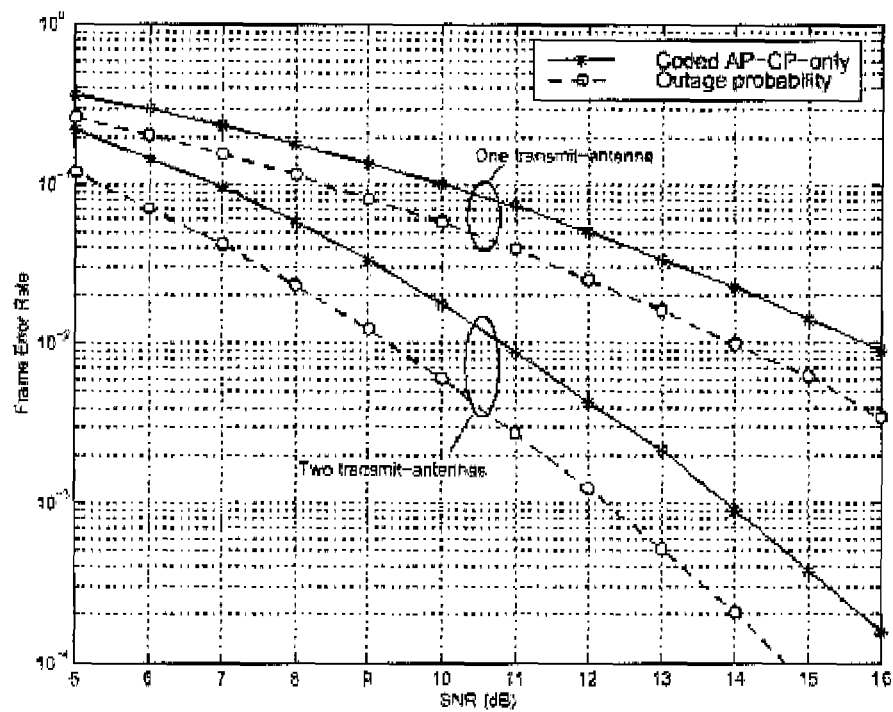
Figure 9:
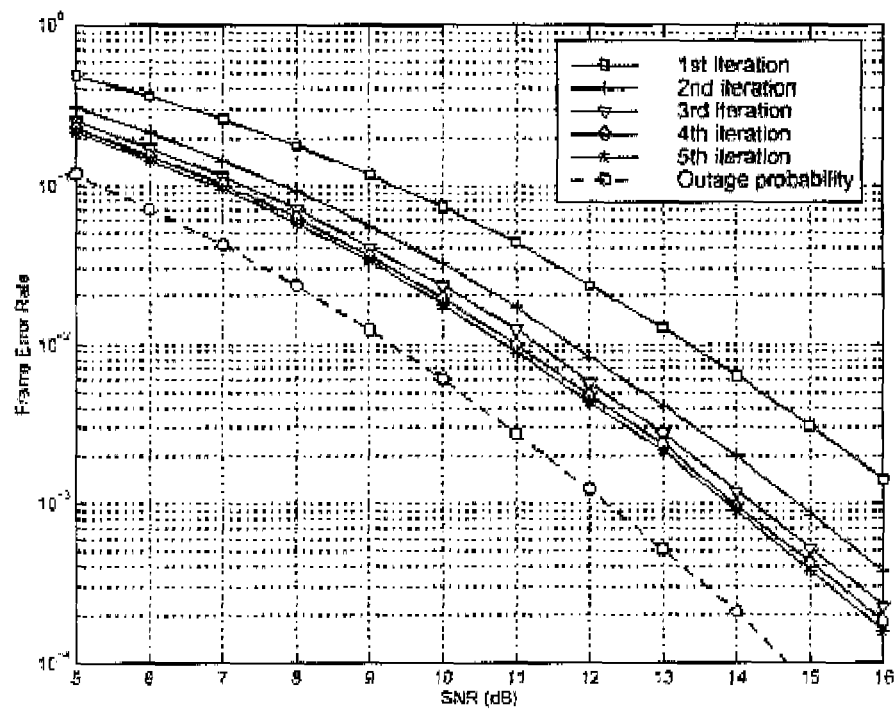

As shown in FIG. 8, the system with two transmit antennas significantly outperforms its counterpart with one transmit antenna. At frame error rate of $10^{-2}$, about 5 dB SNR gain has been achieved. FIG. 9 depicts the performance improvement with turbo iterations, which confirms the importance of iterative over non-iterative receivers. A large portion of the performance gain is achieved within three iterations.

Various embodiments of the invention have been described. These and other embodiments are within the scope of the following claims.

The invention claimed is:

1. A method comprising:
applying, in a transmitting device, a permutation matrix to blocks of symbols of an outbound data stream to permute the blocks of the symbols, wherein the permutation matrix is selected from a plurality of permutation matrices as a function of a symbol index of the outbound data stream, and wherein the selected permutation matrix applies a reverse cyclic shift to the symbols as a function of the symbol index;
generating a space-time block coded matrix from the permuted blocks of the symbols;
generating transmission signals from the space-time block coded matrix; and
communicating the transmission signals through a wireless communication medium.

2. The method of claim 1, wherein the space-time block coded matrix has $N_t$ rows, wherein $N_t$ represents a number of transmitters within a transmission device.

3. The method of claim 2, further comprising:
parsing the outbound data stream of symbols to form blocks of K symbols;
precoding the blocks of K symbols to form blocks having J symbols;
collecting consecutive $N_s$ blocks; and
generating the space-time block coded matrix to have $N_t$ rows and $N_D * J$ symbols per row, wherein $N_D$ represents a number of transmission time intervals for communicating the transmission signals.

4. The method of claim 3, further comprising inserting a cyclic prefix for each of the permuted blocks of the symbols prior to generating the transmission signals, wherein the cyclic prefix has a length selected as a function of a channel order of the wireless communication medium.

5. The method of claim 3, wherein J>K.

6. The method of claim 3, wherein J=K.

7. The method of claim 3, wherein $N_t$=2 and $N_D$=2, and applying the permutation matrix comprises applying the permutation matrix to generate the space-time block coded matrix:

$$\begin{bmatrix} s(2i) & -Ps^*(2i+1) \\ s(2i+1) & Ps^*(2i) \end{bmatrix},$$

where P represents the permutation matrix, i represents an index into the blocks having J symbols, and s represents a symbol block.

8. The method of claim 7, wherein the permutation matrix is drawn from a set of permutation matrices $\{P_j^n\}_{n=0}^{j-1}$.

9. The method of claim 7, wherein each row of a second column of the space-time block coded matrix stores a block that is a conjugated and permuted version of a corresponding block from another row of a first column.

10. The method of claim 3, wherein precoding the blocks of K symbols comprises adding a set of known symbols to each block of K symbols.

11. The method of claim 10, wherein the set of known symbols comprises a preamble and a post-amble.

12. The method of claim 3, further comprising:
receiving a signal from the wireless communication medium, wherein the signal comprises a stream of received symbols;
parsing the received symbols of the signal to form blocks of J symbols;
applying the permutation matrix to the blocks of the received symbols to form permutated blocks; and
separately demodulating transmitted data from the permutated blocks of the received symbols.

13. The method of claim 12, further comprising conjugating and applying a Fast Fourier Transform (FFT) to the permutated blocks of the received symbols.

14. An apparatus comprising:
an encoder to apply a permutation matrix to blocks of information-bearing symbols to form permutated blocks of symbols and to generate a space-time block coded matrix of the permutated blocks of symbols, wherein the permutation matrix applies a reverse cyclic shift to the information-bearing symbols, wherein the encoder is configured to select the permutation matrix from a plurality of permutation matrices as a function of a symbol index, and to apply the selected permutation matrix to perform a reverse cyclic shift as a function of the symbol index;
a plurality of pulse shaping units to generate a plurality of transmission signals from the permutated blocks of symbols of the space-time block coded matrix; and
a plurality of antennae to communicate the transmission signals through a wireless communication medium.

15. The apparatus of claim 14, wherein the encoder is adapted to collect consecutive $N_s$ blocks within a buffer prior for application of the permutation matrix to the $N_s$ blocks, and to form the space-time block coded matrix having $N_t$ rows of symbols.

16. The apparatus of claim 15, wherein $N_t$=2 and the encoder is adapted to apply the permutation matrix to generate the space-time block coded matrix according to the following equation:

$$\begin{bmatrix} s(2i) & -Ps^*(2i+1) \\ s(2i+1) & Ps^*(2i) \end{bmatrix},$$

where P represents the permutation matrix, i represents an index, and s represents a symbol block.

17. The apparatus of claim 16, wherein the permutation matrix is drawn from a set of permutation matrices $\{P_j^n\}_{n=0}^{j-1}$.

18. The apparatus of claim 14, further comprising a precoder to precode the information-bearing symbols to form blocks having J symbols, wherein each row of the space-time block coded matrix contains $N_D * J$ symbols, wherein $N_D$ represents a number of block transmission time intervals for transmitting the space-time block coded matrix.

19. The apparatus of claim 18, wherein the precoder is adapted to add a set of known symbols to each block of K symbols.

20. The apparatus of claim 19, wherein the set of known symbols comprises a preamble and a post amble.

21. The apparatus of claim 19, wherein J>K.

22. The apparatus of claim 19, wherein J=K.

23. The apparatus of claim 14, wherein the apparatus comprises a base station within a wireless communication system.

24. The apparatus of claim 14, wherein the apparatus comprises one of a cellular phone, a personal digital assistant, a laptop computer, a desktop computer, and a two-way communication device.

25. The apparatus of claim 14, wherein the apparatus is adapted to select a cyclic prefix as a length selected as a function of a channel order of the wireless communication medium.

* * * * *